(12) United States Patent
Rezazadegan Tavakoli et al.

(10) Patent No.: US 11,575,938 B2
(45) Date of Patent: Feb. 7, 2023

(54) CASCADED PREDICTION-TRANSFORM APPROACH FOR MIXED MACHINE-HUMAN TARGETED VIDEO CODING

(71) Applicant: Nokia Technologies Oy, Espoo (FI)

(72) Inventors: Hamed Rezazadegan Tavakoli, Espoo (FI); Francesco Cricri, Tampere (FI); Miska Matias Hannuksela, Tampere (FI); Emre Baris Aksu, Tampere (FI); Honglei Zhang, Tampere (FI); Nam Le, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/137,609

(22) Filed: Dec. 30, 2020

(65) Prior Publication Data
US 2021/0218997 A1 Jul. 15, 2021

Related U.S. Application Data

(60) Provisional application No. 62/959,465, filed on Jan. 10, 2020.

(51) Int. Cl.
*H04N 19/124* (2014.01)
*H04N 19/61* (2014.01)
(Continued)

(52) U.S. Cl.
CPC ......... *H04N 19/619* (2014.11); *H04N 19/124* (2014.11); *H04N 19/134* (2014.11); *H04N 19/176* (2014.11); *H04N 19/192* (2014.11)

(58) Field of Classification Search
USPC .................................................. 375/240.03
See application file for complete search history.

(56) References Cited

U.S. PATENT DOCUMENTS

2006/0262861 A1* 11/2006 Kobayashi ........... H04N 19/587
375/E7.181
2009/0067495 A1* 3/2009 Au ........................ H04N 19/61
375/240.12
(Continued)

FOREIGN PATENT DOCUMENTS

CN 107396124 A 11/2017
EP 3633990 A1 4/2020
(Continued)

OTHER PUBLICATIONS

Hu, Y. et al. Towards Coding for Human and Machine Vision: A Scalable Image Coding Approach, arXiv:2001.02915v1, arXiv.org [online],Jan. 9, 2020, [retrieved on Mar. 12, 2021], XP081575332. Retrieved from <https://arxiv.org/abs/2001.02915v1> abstract; sections 3-5; Fig. 1.

(Continued)

*Primary Examiner* — Behrooz M Senfi
(74) *Attorney, Agent, or Firm* — Harrington & Smith

(57) ABSTRACT

Data may be encoded to minimize distortion after decoding, but the quality required for presentation of the decoded data to a machine and the quality required for presentation to a human may be different. To accommodate different quality requirements, video data may be encoded to produce a first set of encoded data and a second set of encoded data, where the first set may be decoded for use by one of a machine consumer or a human consumer, and a combination of the first set and the second set may be decoded for use by the other of a machine consumer or a human consumer. The first and second set may be produced with a neural encoder and a neural decoder, and/or may be produced with the use of prediction and transform neural network modules. A human-targeted structure and a machine-targeted structure may produce the sets of encoded data.

19 Claims, 15 Drawing Sheets

(51) Int. Cl.
  *H04N 19/192* (2014.01)
  *H04N 19/176* (2014.01)
  *H04N 19/134* (2014.01)

(56) References Cited

U.S. PATENT DOCUMENTS

| 2009/0110062 | A1* | 4/2009 | Au | H04N 19/395 |
| | | | | 375/240.03 |
| 2019/0251418 | A1* | 8/2019 | Nakanishi | H04L 69/04 |
| 2020/0304802 | A1* | 9/2020 | Habibian | G06K 9/6271 |

FOREIGN PATENT DOCUMENTS

| KR | 20210023006 A * | 3/2021 | G06N 3/04 |
| WO | WO-2019107881 A1 | 6/2019 | |
| WO | 2020/070376 A1 | 4/2020 | |

OTHER PUBLICATIONS

Chang, J. et al. Layered Conceptual Image Compression via Deep Semantic Synthesis. In: 2019 IEEE International Conference on Image Processing (ICIP). IEEE [online], Aug. 26, 2019, pp. 694-698, [retrieved on Mar. 23, 2021], XP033642202. Retrieved from <https://ieeexplore.ieee.org/document/8803805>, <DOI:10.1109/ICIP.2019.8803805> abstract; section 3; Figs. 2-3.

Tavakoli, H. R. et al. [VCM] Uses Cases for Video Coding for Machines,ISO/IEC JTC1/SC29/WG11 MPEG2019/m51176. MPGE document management system [online], [retrieved on Mar. 23, 2021], XP030221631. Retrieved from <https://dms.mpeg.expert/> section 2.

Gregor. K. et al. Towards Conceptual Compression. arXiv.org [online],Apr. 29, 2016, [retrieved on Mar. 24, 2021], XP080964660. Retrieved from<https://arxiv.org/abs/1604.08772v1> abstract; sections 2-3, subsection 4.5.

Chen, Z. et al. Toward Intelligent Sensing: Intermediate Deep Feature Compression. In: IEEE [online], Sep. 25, 2019, vol. 29, pp. 2230-2243, [retrieved on Mar. 29, 2021], XP011765070. Retrieved from <https://ieeexplore.ieee.org/document/8848858/>, <DOI:10.1109/TIP.2019.2941660> abstract; sections III, IV, VI; Figs. 4, 6.

* cited by examiner

CASCADED PREDICTION-TRANSFORM APPROACH FOR MIXED MACHINE-HUMAN TARGETED VIDEO CODING

CROSS-REFERENCE TO RELATED APPLICATIONS

This application claims the benefit of U.S. Provisional Application No. 62/959,465, filed on Jan. 10, 2020, which is hereby incorporated by reference in its entirety.

BACKGROUND

Technical Field

The example and non-limiting embodiments relate generally to multimedia encoding and decoding. More specifically, the example and non-limiting embodiments relate to encoding and decoding for machine consumption and/or human consumption of decoded data.

Brief Description of Prior Developments

It is known, in machine learning, to construct and train neural networks used with regard to multimedia encoding and decoding.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
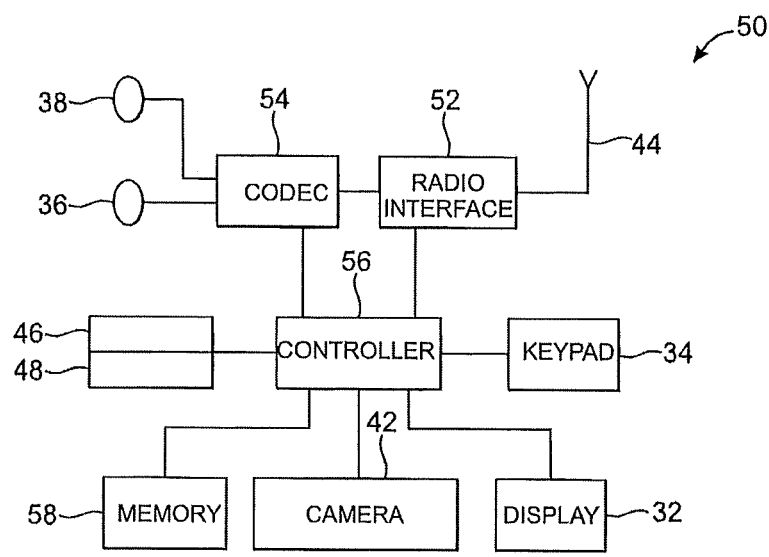
FIG. 1 shows schematically an electronic device employing embodiments of the invention.
Figure 2:
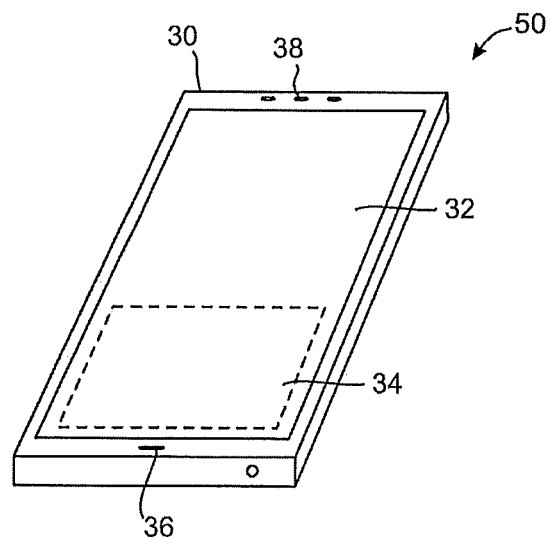
FIG. 2 shows schematically a user equipment suitable for employing embodiments of the invention.

The following abbreviations that may be found in the specification and/or the drawing figures are defined as follows:

CDMA code division multiple access
CNN convolutional neural network
DCT discrete cosine transform
FDMA frequency division multiple access
GSM global systems for mobile communications
H-features human-targeted features
H-TNN human-targeted transform neural network
H-ITNN human-targeted inverse transform neural network
IoT Internet of Things
IMD integrated messaging device
IMS instant messaging service
IQ inverse quantization
I-TNN inverse transform neural network
M-features machine-targeted features
MSE mean squared error
M-ITNN machine-targeted inverse transform neural network
MMS multimedia messaging service
MS-SSIM multi-scale structural similarity index
M-TNN machine-targeted transform neural network
NN neural network
PDA personal digital assistant
PID packet identifier
PLC power-line connection
PSNR peak signal-to-noise ratio
SMS short messaging service
SSIM structural similarity index
TCP-IP transmission control protocol-internet protocol
TDMA time divisional multiple access
T-NN task neural network
TS transport stream
UICC universal integrated circuit card
UMTS universal mobile telecommunications system
WLAN wireless local area network The following describes in further detail suitable apparatus and possible mechanisms for running a neural network (NN) according to embodiments. In this regard reference is first made to FIGS. 1 and 2, where FIG. 1 shows an example block diagram of an apparatus 50. The apparatus may be an Internet of Things (IoT) apparatus configured to perform various functions, such as for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIGS. 1 and 2 will be explained next.

The electronic device 50 may for example be a mobile terminal or user equipment of a wireless communication system, a sensor device, a tag, or other lower power device. However, it would be appreciated that embodiments of the invention may be implemented within any electronic device or apparatus which may process data by/using/with neural networks.

Referring now to FIG. 2, the apparatus 50 may comprise a housing 30 for incorporating and protecting the device. Referring now to both FIGS. 1 and 2, the apparatus 50 may further comprise a display 32 in the form of a liquid crystal display. In other embodiments of the invention the display may be any display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

Referring now to FIG. 1, the apparatus 50 may comprise a controller 56, processor or processor circuitry for controlling the apparatus 50. The controller 56 may be connected to memory 58 which in embodiments of the invention may store both data in the form of image and/or audio data, and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a smart card 46 and a card reader 48, for example a UICC and UICC reader, for providing user information and being suitable for providing authentication information for authentication and authorization of the user at a network.

The apparatus 50 may comprise radio interface circuitry 52 connected to the controller and suitable for generating wireless communication signals, for example for communication with a cellular communications network, a wireless communications system, and/or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller 56 for processing. Additionally or alternatively, the apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

The memory 58 may be of any type suitable to the local technical environment and may be implemented using any suitable data storage technology, such as semiconductor based memory devices, flash memory, magnetic memory devices and systems, optical memory devices and systems, fixed memory and removable memory. The memory 58 may be a non-transitory memory. The memory 58 may be means for performing storage functions. The controller 56 may be or comprise one or more processors, which may be of any type suitable to the local technical environment, and may include one or more of general purpose computers, special purpose computers, microprocessors, digital signal processors (DSPs) and processors based on a multi-core processor architecture, as non-limiting examples. The controller 56 may be means for performing functions.

Figure 3:
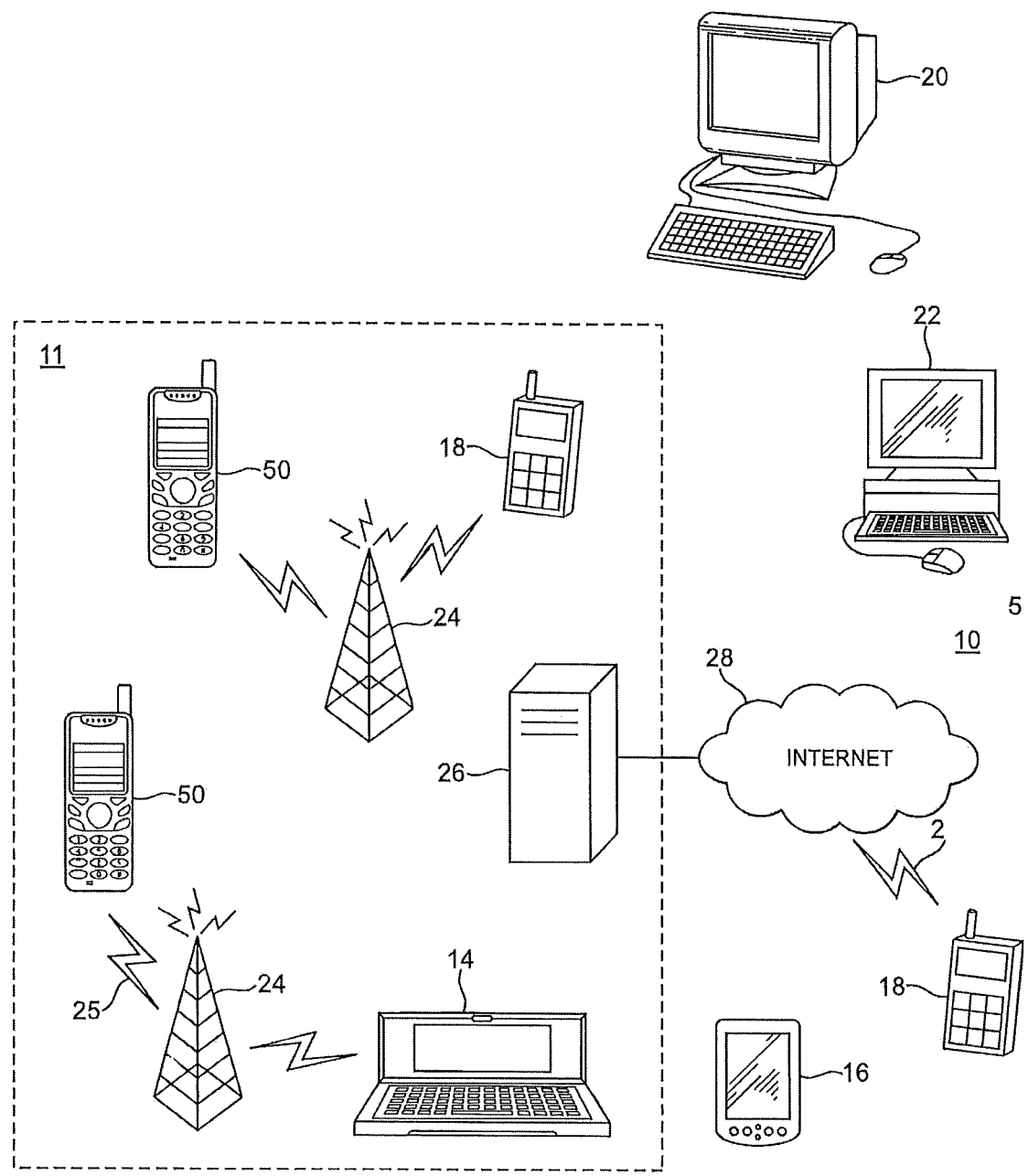
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, 4G, 5G network etc.), a wireless local area network (WLAN) such as defined by any of the IEEE 802.x standards, a Bluetooth personal area network, an Ethernet local area network, a token ring local area network, a wide area network, and/or the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the present invention may communicate using various media including, but not limited to, radio, infrared, laser, cable connections, and any suitable connection.

In telecommunications and data networks, a "channel" may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and will enable many fields of embedded systems, such as wireless sensor networks, control systems, home/building automation, etc. to be included in the Internet of Things (IoT). In order to utilize the Internet, IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Figure 4:
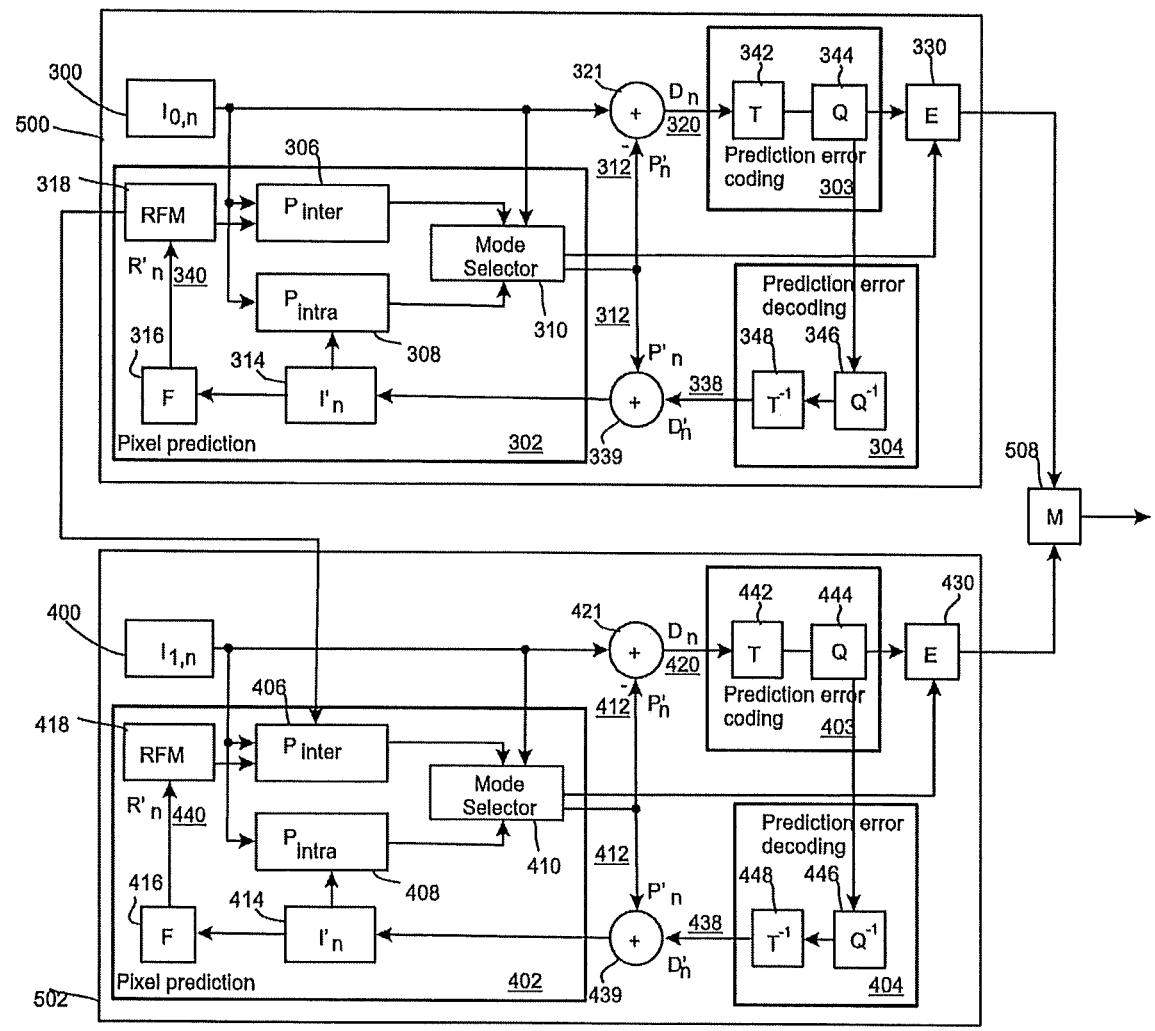
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer images/pictures (300) of a video stream to be encoded at both the inter-predictor 306 (which may determine the difference between the image and a motion compensated reference frame 318) and the intra-predictor 308 (which may determine a prediction for an image block based only on the already processed parts of a current frame or picture). The output of both the inter-predictor 306 and the intra-predictor 308 may be passed to the mode selector 310. The intra-predictor 308 may have more than one intra-prediction modes. Hence, each mode may perform the intra-prediction and provide the predicted signal to the mode selector 310.

The mode selector 310 may also receive a copy of the base layer picture 300. Correspondingly, the pixel predictor 402 of the second encoder section 502 may receive enhancement layer images (400) of a video stream to be encoded at both the inter-predictor 406 (which may determine the difference between the image and a motion compensated reference frame 418) and the intra-predictor 408 (which may determine a prediction for an image block based only on the already processed parts of current frame or picture). The output of both the inter-predictor 406 and the intra-predictor 408 may be passed to the mode selector 410. The intra-predictor 408 may have more than one intra-prediction mode. Hence, each mode may perform the intra-prediction and provide the predicted signal to the mode selector 410. The mode selector 410 may also receive a copy of the enhancement layer picture 400.

Depending on which encoding mode is selected to encode the current block, the output of the inter-predictor 306, 406 or the output of one of the optional intra-predictor modes or the output of a surface encoder within the mode selector may be passed to the output of the mode selector 310, 410. The output of the mode selector may be passed to a first summing device 321, 421. The first summing device may subtract the output of the pixel predictor 302, 402 from the base layer picture 300/enhancement layer picture 400, respectively, to produce a first prediction error signal 320, 420 which may be input to the prediction error encoder 303, 403.

The pixel predictor 302, 402 may further receive from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer picture 400 may be compared in inter-prediction operations. Moreover, the reference frame memory 418 may be connected to the inter-predictor 406 to be used as the reference image against which a future enhancement layer picture 400 may be compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 may comprise a transform unit 342, 442 and a quantizer 344, 444. The transform unit 342, 442 may transform the first prediction error signal 320, 420 to a transform domain. The transform may be, for example, the DCT transform. The quantizer 344, 444 may quantize the transform domain signal, e.g. the DCT coefficients, to form quantized coefficients.

The prediction error decoder 304, 404 may receive the output from the prediction error encoder 303, 403 and perform the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder 304, 404 may be considered to comprise a dequantizer 346, 446, which may dequantize the quantized coefficient values, e.g. DCT coefficients, to reconstruct the transform signal and an inverse transformation unit 348, 448, which may perform the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 may receive the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

A neural network (NN) is a computation graph consisting of two or more layers of computation. Each layer may consist of one or more units, where each unit may perform an elementary computation. A unit may be connected to one or more other units, and the connection may have a weight associated with it. The weight may be used for scaling the signal passing through the associated connection. Weights may be learnable parameters, i.e., values which can be learned from training data. There may be other learnable parameters, such as those of batch-normalization layers.

Two of the most widely used architectures for neural networks are feed-forward and recurrent architectures. Feed-forward neural networks do not comprise a feedback loop; each layer takes input from one or more of the previous layers and provides output, which is used as the input for one or more of the subsequent layers. Units within a layer take input from unit(s) in one or more preceding layers, and provide output to unit(s) of one or more following layers.

Initial layers, i.e. layers close to the input data, extract semantically low-level features from received data, such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural networks, there is a feedback loop, so that the network becomes stateful, i.e., it is able to memorize or retain information or a state.

Neural networks may be utilized in an ever increasing number of applications for many different types of device, such as mobile phones, as described above. Examples of applications may include image and video analysis and processing, social media data analysis, device usage data analysis, etc.

Neural networks, and other machine learning tools, may be able to learn properties from input data, either in a supervised way or in an unsupervised way. Such learning may be the result of a training algorithm, or of a meta-level neural network providing a training signal.

A training algorithm may consist of changing some properties of the neural network so that the output of the neural network is as close as possible to a desired output. For example, in the case of classification of objects in images, the output of the neural network may be used to derive a class or category index, which indicates the class or category to which an object in the input image belongs. Training may comprise changing properties of the neural network so as to minimize or decrease the output's error, also referred to as the loss. Examples of losses include mean squared error (MSE), cross-entropy, etc. In recent deep learning techniques, training is an iterative process, where, at each iteration, the algorithm modifies the weights of the neural network to make a gradual improvement of the network's output, i.e., to gradually decrease the loss.

In this description, the terms "model", "neural network", "neural net," "NN" and "network" may be used interchangeably. In this description, the terms "weights" of neural networks, "learnable parameters," and "parameters" may be used interchangeably.

Training a neural network comprises an optimization process, but the final goal of machine learning is different from the typical goal of optimization. In optimization, the goal is to minimize loss. In machine learning generally, in addition to the goal of optimization, the goal is to make the model learn the properties of the data distribution from a limited training dataset. In other words, the training process is additionally used to ensure that the neural network learns to use a limited training dataset in order to learn to generalize to previously unseen data, i.e., data which was not used for training the model. This additional goal is usually referred to as generalization. In practice, data may be split into at least two sets, the training set and the validation set. The training set may be used for training the network, i.e., for modification of its learnable parameters in order to minimize the loss. The validation set may be used for checking the performance of the neural network with data which was not used to minimize the loss (i.e. which was not part of the training set), where the performance of the neural network with the validation set may be an indication of the final performance of the model. The errors on the training set and on the validation set may be monitored during the training process to understand if the neural network is learning at all and if the neural network is learning to generalize. In the case that the network is learning at all, the training set error should decrease. If the network is not learning, the model may be in the regime of underfitting. In the case that the network is learning to generalize, validation set error should decrease and not be much higher than the training set error. If the training set error is low, but the validation set error is much higher than the training set error, or the validation set error does not decrease, or it even increases, the model may be in the regime of overfitting. Overfitting may mean that the model has memorized the training set's properties and performs well only on that set, but performs poorly on a set not used for tuning its parameters. In other words, the model has not learned to generalize.

Neural networks may be used for compressing and de-compressing data such as images. The most widely used architecture for compressing and de-compressing data is the auto-encoder, which may be a neural network consisting of two parts: a neural encoder and a neural decoder. In this description, a neural encoder may be referred to as an encoder, and a neural decoder may be referred to as a decoder. In this description, an encoder and a decoder may comprise algorithms which are learned from data instead of being tuned by hand.

The encoder may take as input an image or video and produce a code which requires less bits than the input image or video. This code may be obtained by a binarization or quantization process after an encoding process, or after encoding with the encoder. The decoder may take this code and use it to reconstruct the image or video which was input to the encoder.

An encoder and decoder may be trained to minimize a combination of bitrate and distortion, where the distortion is usually Mean Squared Error (MSE), PSNR, SSIM, etc. These distortion metrics are meant to be inversely proportional to the human visual perception quality. In other words, a lower measurement with a distortion metric corresponds to a better perceived quality of the decompressed image by a human.

A video codec may consist of an encoder that transforms the input video into a compressed representation suited for storage/transmission and a decoder that can decompress the compressed video representation back into a viewable form. An encoder may discard some information from the original video sequence in order to represent the video in a more compact form (i.e. at a lower bitrate).

A hybrid video codec, for example ITU-T H.263 or H.264, may encode video information in two phases. In a first phase, pixel values in a certain picture area (or "block") may be predicted, for example by motion compensation means (finding and indicating an area in one of the previously coded video frames that corresponds closely to the block being coded) or by spatial means (using the pixel values around the block to be coded in a specified manner). Other means or methods for predicting pixel values may be known to one of ordinary skill in the art. In a second phase, the prediction error, i.e. the difference between the predicted block of pixels and the original block of pixels, may be coded. This may be done by transforming the difference in pixel values using a specified transform (e.g. Discrete Cosine Transform (DCT) or a variant of it), quantizing the coefficients, and entropy coding the quantized coefficients. By varying the fidelity of the quantization process, an encoder may control the balance between the accuracy of the pixel representation (picture quality) and size of the resulting coded video representation (file size or transmission bitrate).

Inter prediction (which may also be referred to as temporal prediction, motion compensation, and/or motion-compensated prediction) exploits temporal redundancy. In inter prediction, the sources of prediction may be previously decoded pictures, images, and/or video frames.

Intra prediction utilizes the fact that adjacent pixels within the same picture, image, or video frame are likely to be correlated. Intra prediction may be performed in the spatial domain or the transform domain, i.e., either sample values or transform coefficients may be predicted. Intra prediction may be exploited in intra coding, where no inter prediction is applied.

The second phase of the encoding procedure, which may comprise coding of a prediction error, may result in a set of coding parameters, such as motion vectors and/or quantized transform coefficients. The coding parameter(s) may be entropy-coded more efficiently if they are predicted first from spatially or temporally neighboring parameters. For example, a motion vector may be predicted from spatially adjacent motion vectors. The difference relative to the motion vector predictor may be coded. Prediction of coding parameters and intra prediction may be collectively referred to as in-picture prediction.

The decoder may reconstruct the output video from the compressed version of the video by applying prediction means similar to those of the encoder to form a predicted representation of the pixel blocks (using the motion or spatial information created by the encoder and stored in the compressed representation) and prediction error decoding (inverse operation of the prediction error coding, comprising recovering the quantized prediction error signal in the spatial pixel domain). After applying prediction and prediction error decoding means, the decoder may sum up the prediction and prediction error signals (pixel values) to form the output video frame. The decoder (and encoder) may also apply additional filtering means to improve the quality of the output video before passing it for display/use and/or storing it as prediction reference for the forthcoming frames in the video sequence.

In a video codec, the motion information may be indicated with motion vectors associated with each motion compensated image block. Each of these motion vectors may represent the displacement of the image block in the picture to be coded (on the encoder side) or decoded (on the decoder side) and the prediction source block in one of the previously coded or decoded pictures upon which the displacement value is based.

In order to represent motion vectors efficiently, motion vectors may be coded differentially with respect to block-specific predicted motion vectors. The predicted motion vectors may be created in a predefined way, for example by calculating the median of the encoded or decoded motion vectors of adjacent blocks. Another way to create predicted motion vectors may be to generate a list of candidate predictions from adjacent blocks and/or co-located blocks in temporal reference pictures and signaling the chosen candidate as the motion vector predictor. Other methods for creating predicted motion vectors may be known to one of ordinary skill in the art.

In addition to predicting the motion vector values, the reference index of a previously coded/decoded picture may be predicted. The reference index may be predicted from adjacent blocks and/or co-located blocks in a temporal reference picture. Moreover, typical high-efficiency video codecs may employ an additional motion information coding/decoding mechanism, often called merging/merge mode, where all the motion field information, which may include motion vector and corresponding reference picture index for each available reference picture list, may be predicted and used without any modification/correction. Similarly, predicting the motion field information may comprise using the motion field information of adjacent blocks and/or co-located blocks in temporal reference pictures, where the used or chosen motion field information may be signaled or received from signaling based on a list of motion field candidates, which is filled or populated with motion field information of available adjacent/co-located blocks.

In a video encoder, the prediction residual after motion compensation may first be transformed with a transform kernel (like DCT) and then coded. The reason for this is that, often, there may still exist some correlation among the prediction residual, and transform may help reduce this correlation and provide more efficient coding.

A video encoder may utilize Lagrangian cost function(s) to find optimal coding modes, e.g. the desired Macroblock mode and associated motion vectors. These cost functions may use a weighting factor $\lambda$ to tie together the (exact or estimated) image distortion due to lossy coding methods and the (exact or estimated) amount of information that is required to represent the pixel values in an image area according to:

$$C = D + \lambda R$$

where C is the Lagrangian cost to be minimized, D is the image distortion (e.g. Mean Squared Error) with the mode and motion vectors considered, and R is the number of bits needed to represent the required data to reconstruct the image block with the decoder (including the amount of data to represent the candidate motion vectors).

Features as described herein generally relate to the quality of decoded data following encoding and decoding processes. Reducing the distortion in image and video compression is often intended to increase human perceptual quality, as humans are often considered the end users of multimedia data that has been encoded and then decoded, i.e. a human may watch a decoded video or view a decoded image. However, humans are not always the end users of multimedia data that has been encoded and then decoded; recently, with the advent of machine learning, especially deep learning, there is a rising number of machines (e.g., autonomous agents) that analyze (multimedia or other) data independently from humans. These machines or autonomous agents may even make decisions based on the analysis results without human intervention. Examples of such analysis include object detection, scene classification, semantic segmentation, video event detection, anomaly detection, pedestrian tracking, etc. Example of use cases/applications in which machines or autonomous agents make decisions based on such analysis, sometimes without human intervention, are self-driving cars, video surveillance cameras and public safety, smart sensor networks, smart TV and smart advertisement, person re-identification, smart traffic monitoring, drones, etc. Considering the cases in which machines or autonomous agents analyze decoded data and/or make decisions on such analysis, it may be useful for encoding and decoding methods, devices, and/or systems to be configured to produce decoded data of a quality suitable for consumption by machines. A quality metric suitable for producing decoded data for consumption by machines may be, for example, directed to improving the performance of a machine when performing one or more tasks, whereas a quality metric suitable for producing decoded data for consumption by humans may be, for example, directed to producing a perception of quality by a human brain. The quality metrics used to produce each of these outcomes may be different from each other.

In an example embodiment, a method, apparatus, or system may be provided for media compression with regard to quality metric(s) other than human perceptual quality, i.e. for an inter-machine communication scenario. While the following description generally refers to compression of images and/or videos, a person of ordinary skill in the art would understand that the embodiments of this description may be applicable to data or signals having spatio-temporal dimensions or only a spatial dimension or only a temporal dimension.

In an example embodiment, a receiver-side device (which may receive encoded data) may comprise multiple "machines" or neural networks (NNs). In this disclosure, the terms "machine" and "neural networks" are used interchangeably to refer to a process or algorithm, whether learned from data or tuned by hand, for analyzing or processing data as part of a task. These multiple machines or neural networks may be used in a certain combination which is, for example, determined by an orchestrator sub-system, which may automatically configure, coordinate, and/or manage the multiple machines or neural networks. The multiple machines may be used, for example, in succession, based on the output of the previously used machine, i.e. a neural network. In another embodiment, a plurality of machines may be run on the decoded data simultaneously.

Please note that the terms "receiver-side" device and "decoder-side" device are used interchangeably in this disclosure to refer to a physical or abstract entity/device which may comprise one or more machines, where the one or more machines may be run on some encoded and eventually decoded video representation which is encoded by another physical or abstract entity/device, the "encoder-side device". It should be noted that the decoder-side device and the encoder-side device may be physically separate devices, or may be abstractions that reside on or are part of a same physical device.

In an example embodiment, a device D1 may encode data (e.g., video or image data), and a device D2 may decode the data encoded by D1 and may use the decoded data as input for one or more machines. Devices D1 and D2 may be two distinct physical devices, or may be abstracted entities which are part of the same physical device. For example, device D1 may be a device, such as a security camera, located at a distance from device D2, which may be a computer, where device D1 is capable of encoding captured video data and transmitting the encoded video data to device D2, which decodes the received encoded video data and makes the decoded video data available for consumption by a machine or human end user. In another example, devices D1 and D2 may be parts of a same physical device, such as a mobile phone. Devices D1 and D2 may each comprise different memories, processors, and/or computer code, or may overlap in terms of any of their constituent parts. For example, if devices D1 and D2 have access to a same memory, device D1 may store encoded data in the memory, and device D2 may retrieve encoded data from the memory. These are non-limiting examples; other physical or abstract configurations of devices D1 and D2 are possible.

Device D1 may be a device that contains an encoder of data, i.e., that is able to encode data to a bitstream or file so that the encoded bitstream or file comprises less bits than the original data before encoding. Device D1 may create, record, receive, retrieve, or have access to data that needs to be encoded. The encoded data may then be transmitted, made available, or be accessible to one or more devices, such as device D2.

Device D2 may be a device that contains a decoder for the data encoded by device D1. Device D2 may contain one or more machines or neural networks that perform some processing and/or analysis on the decoded data. In one embodiment, the machines that process and/or analyze the decoded data may be part of a device other than device D2. This other or separate device comprising the one or more machines running processing and/or analysis may have sufficient computational power, memory, and power for running those machines.

Device D2 may have means for displaying or rendering decoded video or image(s) to humans. In addition or alternatively, the video display may reside in another device external to device D2. The video display may be a peripheral device, or may be a device to which decoded video is transmitted or made available.

One or more machines of device D2 may be used based on the output of one or more (other) machines of device D2. Therefore, if we consider the whole set of NNs that can be used, only a subset may be used at any time, and the selection of which subset to use may be determined also based on the output of some of the NNs contained in one of the previously selected subsets.

In an example embodiment, there may be provided methods for encoding and decoding of video data so that the encoded video data can be initially decoded for machine consumption or analysis, and then additional encoded video data can be decoded for human consumption. In other words, video data may be encoded to produce a first set of encoded video data and a second set of encoded video data, where the first set may be decoded for use by a machine consumer of decoded video data and a combination of the first set and the second set may be decoded for use by a human consumer of decoded video data. This may be described as a cascade design.

In another example embodiment, the opposite process may be performed. There may be provided methods for encoding and decoding of video data so that the encoded video data can be initially decoded for human consumption, and then additional encoded video data can be decoded for machine consumption and analysis. In other words, video data may be encoded to produce a first set of encoded video data and a second set of encoded video data, where the first set may be decoded for use by a human consumer of decoded video data and a combination of the first set and the second set may be decoded for use by a machine consumer of decoded video data. The first set of video data may be encoded and decoded by using a conventional video codec such as H.265 or H.266. The second set of video data may be encoded and decoded by using one or more neural networks. In this embodiment, the second set of encoded video data may encode information that, when decoded, may be useful to a machine consumer of decoded video data, but may have been lost during the encoding process used to produce the first set of encoded video data.

It may be that decoded video information is consumed or analyzed by one or more machines (e.g., for event recognition) more often than by one or more humans. When consumed by humans, the decoded video information may be consumed by humans only, or in combination with machine consumption. It may be that decoded video data is consumed or analyzed by one or more machines until a certain event of interest is recognized by one or more machines, at which point a notification may be sent to one or more human supervisors who may then request to watch the video. The video watched by the human may be one of the following:

The same video portion that was analyzed by the machine;

A video portion which follows the video portion analyzed by the machine, either starting (substantially) from the moment, instant, or time at which the machine recognized the event of interest, or starting (substantially) from the moment, instant, or time at which the human requested to watch the video; and/or A video portion which includes both the portion analyzed by the machine and at least one of the portions following the portion analyzed by the machine.

In some embodiments, the human may request to watch a video portion which refers to a point in time occurring before the event of interest.

In some of the above use-cases, a buffer may be used at the decoder side/decoder device to store encoded or decoded base layer data. As a non-limiting example, the decoder may store in the buffer machine-targeted data which may be used in producing a human-consumable video portion. The decoder may be configured to store in the buffer one or more portions of the encoded or decoded machine-targeted data. Storage may occur after decoding of a portion of encoded machine-targeted data. The decoder may be configured to retrieve a relevant portion of the stored machine-targeted data to produce a human-consumable video, which may be chosen as in the above use-cases. The stored machine-targeted data, i.e. "base layer" information, may be used in combination with human-targeted data, i.e. "enhancement layer" information to produce a decoded video portion which may be displayed to and/or watched by a human, as further discussed below.

Alternatively, in a case in which "base layer" information is targeted to a human and "enhancement layer" information is targeted to a machine, a buffer may be used at the decoder side/decoder device to store encoded or decoded base layer data for potential later use in producing decoded data that may be used as input to a computer or machine.

In an example embodiment, device D2 may decode video in two forms, where one form comprises data which may be input to one or more machines (i.e. may be provided for machine consumption or analysis), and another form comprises data which may be used for human consumption (i.e., may be displayed using a video display device). The second form may be obtained by combining the first form with additional information which may be encoded by the encoder. The first form may be thought of as a "base layer" information, and additional information which may be used to derive the second form can be thought of as an "enhancement layer" information. This "enhancement layer" information may serve to convert the "base layer" information, which comprises machine-understandable information, into human-understandable information.

In another example embodiment, the other way around is also possible, where the decoded "base layer" information may comprise a video which may be displayed for and understandable by humans, and the "enhancement layer" information may carry additional data that may serve to convert the "base layer" information into machine-understandable information. In this embodiment, the additional data of the "enhancement layer" may improve the performance of the machines with respect to the case where machines consume only the "base layer."

In an example embodiment, these two types or forms of information may be encoded and decoded by a cascaded design, where the first stage of the cascade is the machine-targeted structure and the second stage of the cascade is the human-targeted structure. There may be two main approaches by which such cascaded design may be realized, which may be referred to as approach A and approach B.

In an example embodiment, a structure may be provided in which a neural encoder and neural decoder may be used as the main encoding and decoding modules. Approach A may comprise this structure. This structure may allow for a cascade design, where image or video data is first encoded and decoded for machine consumption, and additional information is encoded and decoded for human consumption. Thus, reconstructing a video for human consumption may require first decoding encoded data for machine consumption and then combining this decoded data with decoded additional information. For example, decoded data for machine consumption may comprise a video or features of a video that were extracted and then encoded. This decoded video or features may be combined with decoded additional information to produce a video that may be displayed for human consumption.

In a case in which the "base layer" is human-targeted and the "enhancement layer" is machine-targeted, the cascaded design may allow for, encoding of data suitable for machine consumption. For example, a video encoded and decoded for human consumption may be combined with additional decoded data to produce a version of the video which may be suitable for input to a machine. This may be equivalent to adding, to the encoded and decoded human-targeted video, information which was lost during the encoding/decoding process that may be useful as input to the machine.

Figure 5:
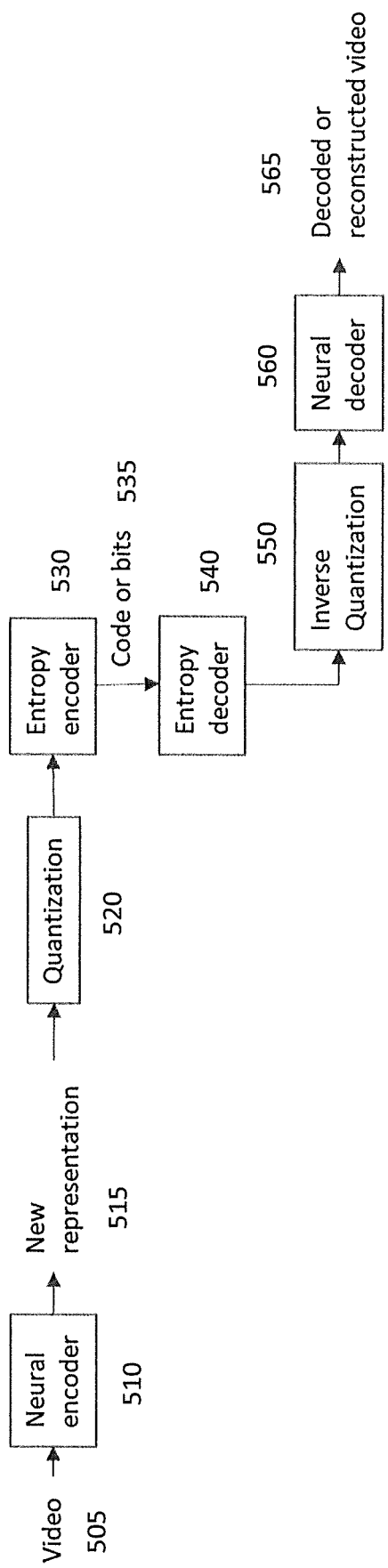
FIG. 5 is a diagram illustrating features as described herein.

Referring now to FIG. 5, approach A may be based on the illustrated structure design for encoding and decoding image or video data. The structure for approach A may comprise an encoder side and a decoder side. The encoder side may comprise a neural encoder 510, a quantization step 520, and a lossless codec module 530. The decoder side may comprise a lossless decoder 540, an inverse quantization step 550, and a neural decoder 560. Additional or different components may be included in the encoder side and/or the decoder side, and additional or different steps may be included in the structure design for approach A.

The use of a neural encoder 510 may be configured to convert the input video 505 (e.g., a set of frames, or the whole video) to a new representation of that video 515, which may be more compressible by/to a lossless encoder 530. The output 515 of the neural encoder 510 may be quantized at 520, for example by using scalable and uniform quantization methods, or codebook-based quantization methods. The quantized data may then be input to a lossless codec module, which may comprise an entropy encoder 530 such as an arithmetic encoder and/or (possibly) other sub-modules, to estimate the probability of the next symbol to the encoder (which may be input to the arithmetic encoder). A person of ordinary skill in the art would understand that while only an entropy encoder 530 is included in FIG. 5, a lossless codec module may comprise an additional or different module(s) and may take as input the quantized data produced by the quantization step 520. The inclusion of an entropy encoder 530 is not intended to limit the type of lossless codec module used nor the quantity of modules used to perform lossless encoding.

Code or bits 535 may be produced by the lossless codec module 530 and/or as a result of the encoder side. Code or bits 535 may comprise compressed data and/or metadata related to compressed data. This code or these bits 535 may be stored in memory which may be accessible by the decoder side, transmitted to a decoder side, or otherwise made available for decoding.

The decoder (at decoder side and/or at encoder side) may comprise a lossless decoder 540, such as an arithmetic decoder and/or other sub-modules. The inclusion of an entropy decoder in FIG. 5 is not intended to limit the type of lossless decoder used nor the quantity of modules used to perform lossless decoding. The lossless-decoded data may then be de-quantized 550 (i.e. may be subject to inverse quantization). The de-quantized data may then be input to a neural decoder 560, which may for example comprise reverse operations with respect to the operations performed by the neural encoder 510. For example, the neural encoder 510 and neural decoder 560 may be components of a neural auto-encoder architecture. The neural decoder 560 may output decoded or reconstructed video information 565. A reconstructed video may be rendered or presented with a video display, which may be part of the decoder side or separate from the decoder side, or may be stored in memory for later viewing/use.

Neural encoder 510 may be a convolutional neural network where the convolutional layers may perform one or more of the following convolutions: 1D convolution, 2D convolution, 3D convolution, 4D convolution, etc. Alternatively, the neural encoder may comprise a recurrent neural network, such as a convolutional Long Short-Term Network. In yet another possible implementation, the neural encoder may comprise a two-stream convolutional network, where one stream or branch processes spatial information and the other stream or branch processes temporal information. However, it should be noted that the design of FIG. 5 is not restricted to any specific architecture for the neural encoder 510 and other neural network components, such as the neural decoder 560.

Figure 6:
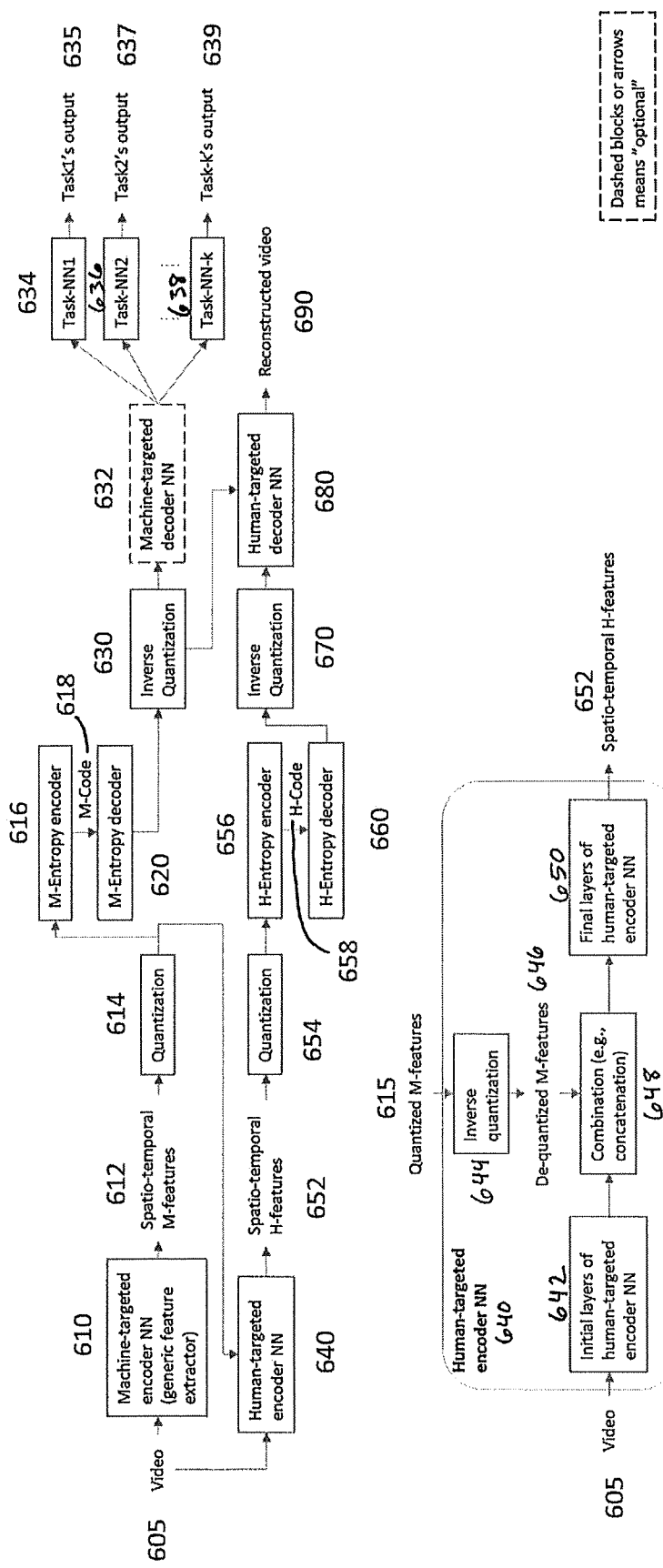
FIG. 6 is a diagram illustrating features as described herein.

Referring now to FIG. 6, illustrated is an inference pipeline for approach A. In approach A, a video or a video segment (a set of frames) may be input to a neural encoder to produce a more compressible representation of that video or video segment. The spatial and temporal information may be handled within the neural encoder, thus the output of the encoder may be referred to as spatio-temporal features or spatio-temporal M-features, where M stands for machine (i.e. machine-targeted).

In an example embodiment, as illustrated in FIG. 6, two instances of the design illustrated in FIG. 5 may be used, where one instance may represent the structure or pipeline for the machine-targeted data and another instance may represent the structure or pipeline for the human-targeted data. However, these two structures may be slightly different from each other, as the human-targeted structure needs to take into account what information has already been encoded and decoded for the machine consumption, i.e. "base layer" information.

In the machine-targeted instance, a video or a video segment 605 may be input to a machine-targeted neural encoder 610, which may be configured to perform generic feature extraction. The output spatio-temporal M-features 612 may undergo quantization 614. The quantized output may undergo lossless encoding 616, which may be performed with a machine-targeted entropy encoder or some other module(s) known to one of ordinary skill in the art. The output machine-targeted encoded data 618 may be stored in memory or otherwise made available for analysis and/or consumption with one or more computers. Before analysis, the M-code 618 may be decoded. Decoding may comprise use of a lossless decoder, such as M-entropy decoder 620 or some other module(s) known to one of ordinary skill in the art. The decoded output may undergo inverse quantization, 630. The inverse quantized output may be decoded with a machine-targeted decoder neural network 632, which may for example comprise reverse operations with respect to the operations performed by the neural encoder 610. Note that decoding with the machine-targeted decoder NN 632 comprises an optional step/component. For example, if the neural encoder 610 comprises a feature extractor, then the quantized and de-quantized features may be input to the task neural networks 634, 636, and/or 638 without further decoding. One possible reason to have a decoder 632 may be for the case where the task NNs 634, 636, and/or 638 were trained with normal video data and were not modified afterwards.

Regarding the structure for the machine-targeted data, the reconstructed video or video segment may be input to the task neural networks at 634, 636, and/or 638. "Task neural networks" or "task NNs" or "TNN," interchangeably, may be the machines which perform some analysis or processing on the videos. There may be one or more task neural networks. The example embodiment is not limited by the three TNN illustrated in FIG. 6; more or fewer TNN may use the reconstructed video or video segment as input. Depending on the specific task that a TNN performs, the video may be input to the TNN either frame by frame, or as a set of frames.

In FIG. 6, Task-NN1 (634), Task-NN2 (636), and additional task neural networks up to and including Task-NN-k (638) may each produce output, i.e. 635, 637, and 638, respectively. Output may comprise processed video or video segments, or the results of analysis.

The human-targeted structure may be used to encode and decode information which is needed to reconstruct human-targeted video from the decoded machine-targeted data (features or video).

This structure takes as input to the human-targeted encoder 640 and to the human-targeted decoder 680 the decoded machine-targeted data, or some form of the decoded machine-targeted data. For example, the dequantized machine-targeted data at 646 or 630 (and eventually decoded, if a decoder is used in the machine-targeted structure, at 632) may be combined or concatenated 648 with the output of (some) initial layers of the neural encoder, 642. Note that quantized M-features 615 derived from the quantization step 614 may undergo inverse quantization 644 to produce de-quantized M-features 646. After combination/concatenation 648, (some) final layers of the neural encoder 650 may take as input the output of the concatenation operation 648 to produce spatio-temporal H-features 652.

The spatio-temporal H-features 652 may undergo quantization 654. The quantized output may undergo lossless encoding 656, which may be performed with a human-targeted entropy encoder or some other module(s) known to one of ordinary skill in the art. The output human-targeted encoded data 658 may be stored in memory or otherwise made available for analysis and/or consumption by one or more humans. Before human consumption, the H-code 658 may be decoded. Decoding may comprise use of a lossless decoder, such as H-entropy decoder 660 or some other module(s) known to one of ordinary skill in the art. The decoded output may undergo inverse quantization, 670. The inverse quantized output may be decoded with a human-targeted decoder neural network 680, which may for example comprise reverse operations with respect to the operations performed by the neural encoder 640. The human-targeted decoder neural network 680 may also take as input the dequantized M-features from 630 (or, potentially, 632). The human-targeted decoder neural network 680 may output a reconstructed video or video segment 690.

Training of the design for approach A (FIG. 5) or the inference pipeline for approach A (FIG. 6) may comprise minimizing Mean Squared Error (MSE) loss computed on the original video 505 and the decoded video 565, for example by computing gradients of this loss with respect to the neural encoder's 510 and decoder's 560 parameters by backpropagation and computing a weight-update based on a certain optimizer (such as Stochastic Gradient Descent, Adam, AdaGrad, etc.). Other losses and methods for deriving a weight-update may be considered.

In an example embodiment, multiple losses may be considered in the training. For example, one, some, or all of the following losses may be included:

Task loss(es), which may be derived by using the task NNs 634, 636, and/or 638 (e.g., cross-entropy for classifier NN, MSE for regression NN, etc.). For the k-th task, the loss may be represented with Lin.

MSE loss (and/or other perceptual loss) for the human-watchable video. This loss may be referred to as $L_H$. Other suitable losses/loss measurements may be used in addition to or instead of MSE, such as perceptual losses like MS-SSIM, losses derived from neural networks (such as MSE computed on the features extracted by a pretrained NN, or adversarial losses), etc.

Rate loss(es), which may include a loss for the machine-targeted bitstream ($L_{Rm}$) and a loss for the human-targeted bitstream ($L_{Rh}$). Rate loss may be an objective function which may be (roughly, or most of the time) proportional to entropy. In general, the rate loss may be used to train the codec to encode data into a short bitstream. In some embodiments, the rate loss may be an estimate of the negative probability for the next symbol to be encoded. Minimizing the rate loss during training may thus correspond to minimizing the entropy, and thus to achieving higher compression when using an entropy coding scheme such as arithmetic coding.

If all the foregoing losses are used for training, the total loss may be a weighted sum of the different loss terms:

$$L=\lambda_{Rm}L_{Rm}+\lambda_{Rh}L_{Rh}+\lambda_H L_H+\lambda_{T1}L_{T1}+\lambda_{T2}L_{T2}+\ldots+\lambda_{Tk}L_{Tk}$$

The terms $\lambda_{Rm}$, $\lambda_{Rh}$, $\lambda_h$, $\lambda_{T1}$, $\lambda_{T2}$, and $\lambda_{Tk}$ may represent weights applied to these terms. The weights may change during training.

It should be noted that this is not an exhaustive list of losses that may be included in the training of approach A. Additional or different losses may occur to a person of ordinary skill in the art. It should also be noted that not all the losses discussed above need be used in training.

In an example embodiment, the losses may be used as follows:

The task losses may be used to train one or more of the NNs in the machine-targeted structure (e.g. 610, 616, 620, 632, 634, 636, 638). The task losses may be differentiated with respect to the gradients of the NNs in the machine-targeted structure. It should be noted that training the machines (e.g. 634, 636, 638) may be optional.

The MSE (and/or other perceptual loss) may be used to train one or more of the NNs in the human-targeted structure (e.g. 640, 642, 648, 650, 656, 660, 680). Alternatively or additionally, the MSE may be used to train the NNs in the machine-targeted structure (e.g. 610, 616, 620, 632, 634, 636, 638).

The rate loss computed on the machine-targeted data may be used to train one or more of the NNs in the encoder part of the machine-targeted structure, such as any NNs used for lossless encoding (e.g. 616), and the neural encoder 610.

The rate loss computed on the human-targeted data may be used to train one or more of the NNs in the encoder part of the human-targeted structure, such as any NNs used for lossless encoding (e.g. 656), and the neural encoder (e.g. 640, 642, 650). Alternatively or additionally, the rate loss computed on the human-targeted data may be used to train one or more of the NNs in the encoder part of the machine-targeted structure (e.g. 610, 616).

When a certain loss term is used to train NNs in both the machine-targeted structure and the human-targeted structure, the loss term may be weighted differently for each of these two cases. Alternatively, the obtained gradients may be weighted differently. For example, MSE may be more important for training the human-targeted structure and thus the gradients obtained when differentiating the MSE with respect to the parameters of the NNs in the human-targeted structure may be weighted more heavily/prominently than the gradients obtained when differentiating the MSE with respect to the parameters of the NNs in the machine-targeted structure.

In an example embodiment, the task NNs (634, 636, and/or 638) may also be modified according to the task losses. Such modification may comprise modifications of the weights of a fixed architecture for a task NN (for example by a training or fine-tuning process), or may comprise architectural modifications where the goal is to simplify or adapt the task NN(s) to the machine-targeted features (M-features).

Figure 7:
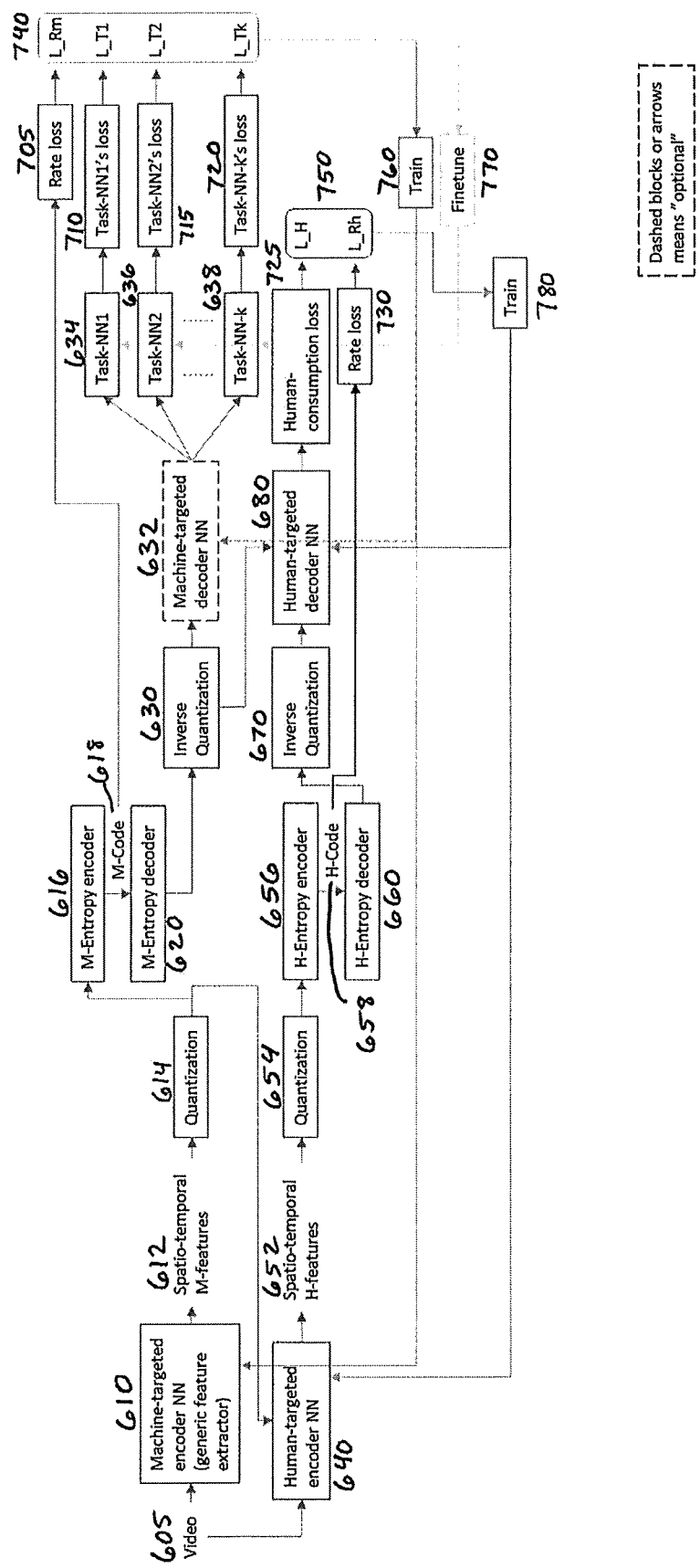
FIG. 7 is a diagram illustrating features as described herein.

Referring now to FIG. 7, illustrated is an example of training an inference pipeline for approach A as illustrated in FIG. 6. Where appropriate, the same numbering as in FIG. 6 has been used, and the description of those components/steps is omitted for the sake of simplicity. A rate loss 705 may be determined based on the M-code 618. A task loss 710 may be determined for Task-NN1 634. A task loss 715 may be determined for Task-NN2 636. A task loss 720 may be determined for Task-NN-k 638. A human-consumption loss 725 may be determined for the reconstructed video from the human-targeted decoder NN 680. A rate loss 730 may be determined based on H-code 658. The rate loss 705, Task-NN1's loss 710, Task-NN2's loss 715, and Task-NN-k's loss 720, collectively referred to at/as 740, may be used to train 760 the machine-targeted decoder NN 632, if included, and the machine-targeted encoder NN 610. Optionally, the losses 740 may be used to fine-tune 770 the one, some, or all of the tasks Task-NN1 634, Task-NN2 636, and/or Task-NN-k 638. The human-consumption loss 725 and the rate loss 730, collectively referred to at/as 750, may be used to train 780 the human-targeted decoded NN 680 and the human-targeted encoder NN 640.

In an example embodiment, a structure may be provided which performs prediction and transform, where the internal modules are mainly neural networks. Approach B may comprise this structure. This structure may allow for a cascade design, where image or video data is first encoded and decoded for machine consumption, and additional information is encoded and decoded for human consumption. Thus, reconstructing a video for human consumption may require first decoding video for machine consumption and then combining this decoded video with the decoded additional information. The other way around may also be possible, where first a video may be encoded and decoded for human consumption, and a refined version of that video may be obtained by combining the human-understandable encoded and decoded video with decoded additional information.

Figure 8:
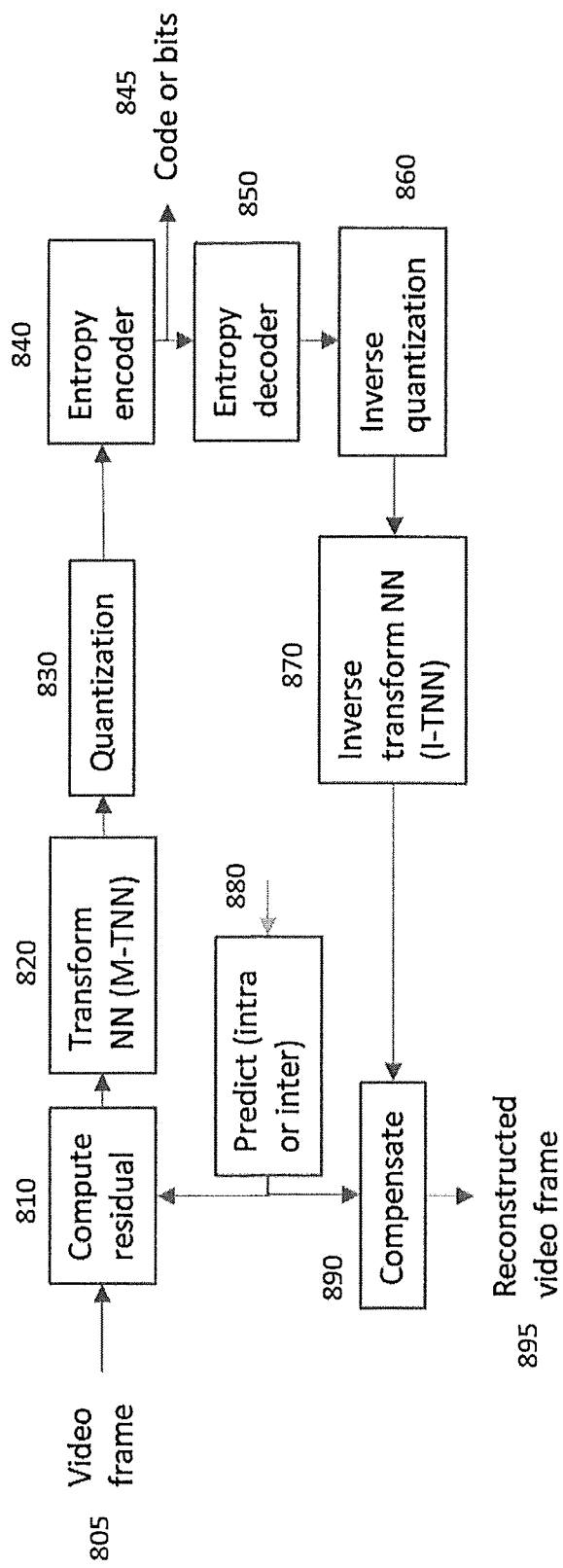
FIG. 8 is a diagram illustrating features as described herein.

Referring now to FIG. 8, approach B may be based on the illustrated structure design for encoding and decoding image or video data. Approach B may be based on the design of conventional video codecs, but where the individual modules may be neural networks. Video codecs may work on a block level, i.e., at least some of the modules are applied to blocks or patches of the frames, instead of being applied to the full frames. In the example embodiment, the modules may be applied on a block level or on a frame level. A video frame or block of a video frame may be used to compute a residual or prediction error 810. The residual may be computed 810 by subtracting from the input original block or frame 805 a predicted block, where the prediction may be performed based on previously decoded blocks (either from the same frame, or from one or more different frames, or both). The prediction may be performed by a prediction module 880 which may be a neural network.

The computed residual or prediction error may then be compressed into a small amount of bits. The residual may be subject to a transformation 820, for example a neural network (Transform NN or M-TNN) which transforms the residual to a new representation which is more compressible by a lossless encoder 840. The transformed residual may be input to a quantization process 630, as for approach A at 520. The quantized residual may be input to a lossless encoder 840, as for approach A at 530. A person of ordinary skill in the art would understand that while only an entropy encoder 840 is included in FIG. 8, a lossless codec module may comprise an additional or different module(s) and may take as input the quantized data produced by the quantization step 830. The inclusion of an entropy encoder 840 is not intended to limit the type of lossless encoder used nor the quantity of modules used to perform lossless encoding.

Code or bits 845 may be produced by the lossless codec module 840 and/or as a result of the encoder side. Code or bits 845 may comprise compressed data and/or metadata related to compressed data. This code or these bits 845 may be stored in memory which may be accessible by the decoder side, transmitted to a decoder side, or otherwise made available for decoding.

The encoder side may also comprise a decoder, which may be referred to as a decoding loop. The decoding loop may be included so that the prediction module 880 may perform the prediction based on previously decoded data. The lossless encoded data may be input to a lossless decoder 850 and eventually to an inverse quantization process 860. The inclusion of an entropy decoder in FIG. 8 is not intended to limit the type of lossless decoder used nor the quantity of modules used to perform lossless decoding. The dequantized residual may then be input to an inverse transform process 870, such as an inverse-transform neural network (I-TNN). The output of this neural network 870 may be combined with the output of the prediction module 880 to get the final reconstructed or decoded block or frame 895. The output of the prediction module 880 may go through a compensation step 890 before combination. The output of the I-TNN 870 may go through a compensation step 890 before combination. This decoded block or frame 895 may be input to the prediction module 880, to be used for predicting the next block at 810.

FIG. 8 illustrates an encoder comprising a decoder loop, which may be used to enable the compensation step of the machine-targeted structure and/or the encoding process used to produce encoded data. While a separate decoder is not illustrated in FIG. 8, a person of ordinary skill in the art would understand that a decoder or decoder side, which may or may not be physically or logically separate from the encoder, may process the encoded code or bits 845 in a manner similar to the illustrated decoding loop using similar elements.

Figure 9:
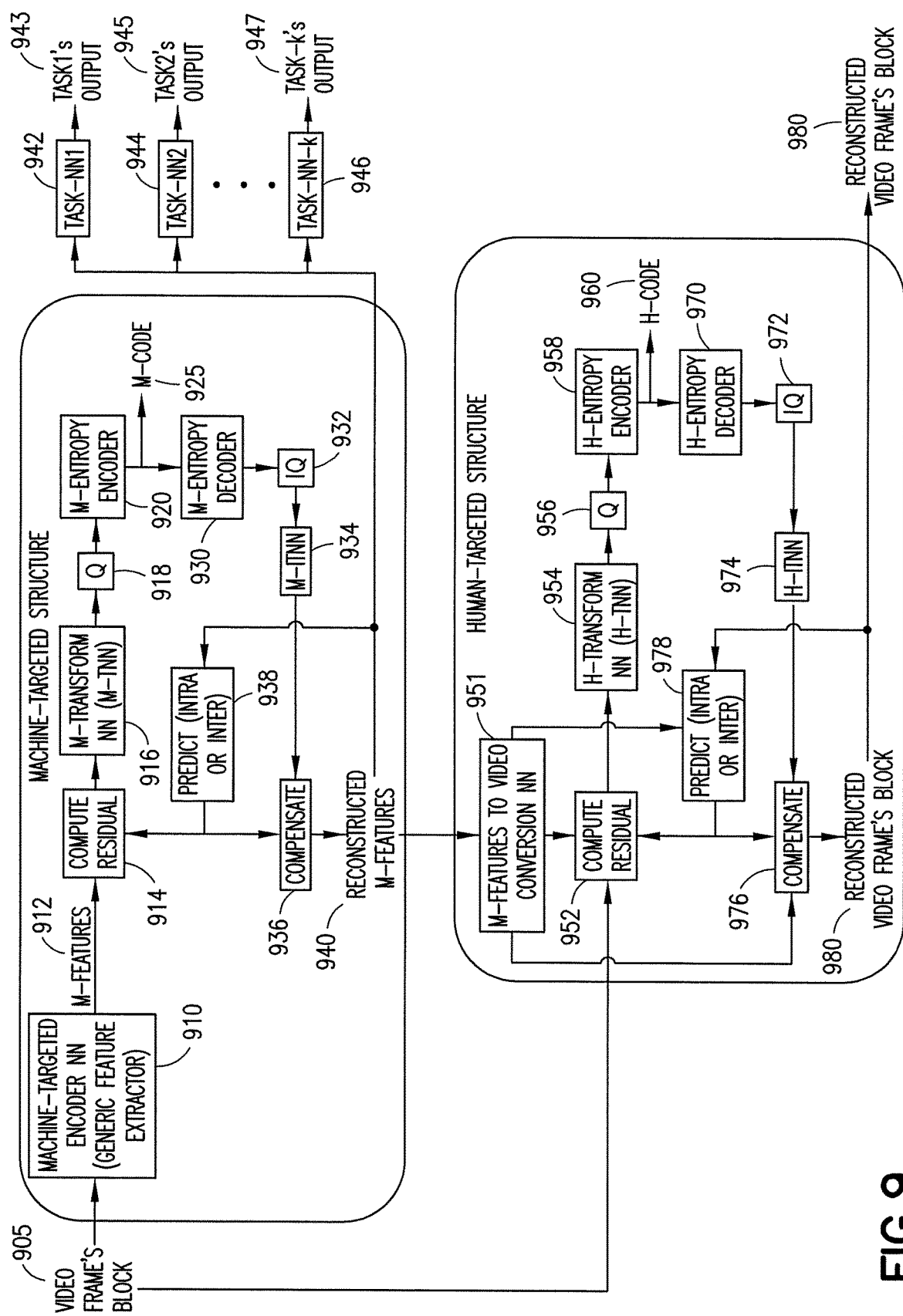
FIG. 9 is a diagram illustrating features as described herein.

Referring now to FIG. 9, illustrated is an inference pipeline for approach B. FIG. 9 may be considered an adaptation of the design of FIG. 8, which is based on prediction of a block or frame, and subsequent compression of the prediction residual or error. In an example embodiment, processing steps may be performed on a frame-block or frame-patch level. However, the same design can be extended to support full frames; the example embodiment illustrated in FIG. 9 is not limited to processing at the frame-block level.

As in approach A, approach B may be considered a cascaded design, where one structure may be responsible for encoding and decoding the machine-targeted data (machine-targeted structure), and another structure may be responsible for handling the additional information needed to encode and decode the human-targeted data (human-targeted structure), as illustrated in FIG. 9.

FIG. 9 illustrates an encoder comprising a decoder loop, which may be used to enable the compensation step of the machine-targeted structure and/or the encoding process used to produce the human-targeted set of encoded data. While a separate decoder is not illustrated in FIG. 9, a person of ordinary skill in the art would understand that a decoder, which may or may not be physically or logically separate from the encoder, may process the encoded M-Code 925 and/or the encoded H-Code 960 in a manner similar to the illustrated decoding loops of the machine-targeted structure and/or the human-targeted structure. Decoding of the encoded data is discussed below with reference to the elements illustrated in FIG. 9, but this description may be understood to refer to similar elements that may reside in a decoder or decoder side used to decode M-Code 925 and/or H-Code 960 for display, consumption, further processing, and/or analysis.

Referring now to FIG. 9, the machine-targeted encoder 910 of the machine-targeted structure takes as input a block of a video frame 905. The machine-targeted encoder 910 may be a neural network encoder and/or may comprise a feature extraction step, which may include/involve one or more neural networks. For example, the machine-targeted encoder 910 may be a convolutional neural network (CNN), which may be either a feed-forward CNN or a recurrent CNN, or a combination of these. The output of this feature extraction module may be features describing the input frame-block, 912, which may be machine-targeted features.

A prediction residual, or prediction error, or simply residual, may be obtained or computed 914 by computing a difference or other type of distance measurement between the original features extracted by the feature extraction module at 910 (i.e. M-features 912) and a prediction of those features. The prediction may be performed by a prediction module 938 which may include one or more neural networks. The prediction may be performed based on previously decoded or reconstructed feature-blocks 940, such as other feature-blocks within the same frame (intra-prediction) or other feature-blocks within other frames (inter-prediction) or a combination of intra and inter prediction. These predicted feature-blocks may or may not be compensated. In an example embodiment, computation of a residual 914 may comprise a simple element-wise difference between the original feature-block and the predicted feature-block at 938.

The computed residual may then be compressed by following one or more of the following steps:
  A transformation 916 to a more compact or more compressible representation (e.g., lower entropy). For example, this step may be performed by a module 916 which includes one or more neural networks, such as a machine-targeted transform neural network (M-TNN).
  A quantization process 918, which may decrease the average precision of the representation in terms of bit-depth. For example, the original residual 914 may be represented using floating-point 32 bits, and the output of the quantization 918 may be represented using fixed-point 8 bits. In an example embodiment, adaptive bit allocation may be possible, where each element of the residual 914 may be represented using a different bit-depth.
  A lossless coding process 920, which may include an entropy coding process such as an arithmetic codec. This module 920 may include one or more neural networks. For example, one or more neural networks may provide the arithmetic encoder 920 and decoder 930 with information about the probability of the next element or symbol to encode and decode, respectively. It should be noted that the lossless coding process 920 is not limited to an entropy coding process.

As a result of the encoder side of the machine-targeted structure, M-code 925 may be produced. This encoded video data may be stored in memory, transmitted to another device, or otherwise made available for decoding.

As in other conventional codecs, the encoder side may include also a decoding loop in addition to the encoding part. The decoding loop may include steps which may try to revert the operations done by the encoder part in order to reconstruct the block-features. The set of specific steps which are performed depends on which steps were performed at the encoder part. In an example embodiment, the encoding part included a transformation 916, a quantization 918, and/or a lossless encoding 920 step(s), and the decoding loop (and the decoder-side) may include a lossless decoding 930, an inverse quantization 932, an inverse transformation (M-ITNN) 934, and/or a compensation 936 step(s).

The inverse transformation 934 may include/involve one or more neural networks. The output of the inverse transformation step 934 may be referred to as the reconstructed residual or reconstructed prediction error. The compensation step 936 may combine the prediction 938 and the reconstructed residual output from the inverse transformation 934 in order to reconstruct the block-features 940. Additionally, the reconstructed block-features may be further processed by a filtering module in order to improve the reconstruction 940, which is not shown in FIG. 9.

The reconstructed feature-block 940 may be used by the prediction module 938 to predict the next feature-block to be encoded or decoded.

The reconstructed feature-block 940 may be used by one or more computers or machines to complete analysis or processing tasks, such as one or more of tasks Task-NN1 942, Task-NN2 944, and/or Task-NN-k 946 of the decoder/decoder side. The task(s) may output the result of analysis and/or processed reconstructed feature-block 940, as illustrated at 943, 945, and 947, respectively. This output may be stored in memory and/or transmitted to another device and/or to a user interface.

Referring now to FIG. 9, the human-targeted structure may follow a similar design as the machine-targeted structure, but with the following differences:
  The data of interest, which may be reconstructed via the decoding operations, may be the original input video frame or block 905 (instead of extracted features). Thus, there may be no feature extraction module 910 included in the human-targeted structure. This difference between the structures may serve to recognize that, in an example embodiment, the output of the human-targeted structure is a reconstructed video frame's block, 970, rather than reconstructed M-features, 940.
  The prediction error may be obtained by using not only the input video frame's block 905, but also by using the reconstructed machine-targeted features 940 (or a processed version of those features). For example, the prediction error may be computed 952 by elementwise-subtracting from the input frame block 905 the predicted block and the reconstructed (and eventually processed) machine-targeted features 940.
  If processed version(s) of the machine-features 940 are used for computing the residual 952, the compensation module 976 which reconstructs the block may take as input also the processed machine-features 940 in addition to the reconstructed residual at 952 and the output of the prediction module 978.

In an example embodiment of approach B, in the human-targeted structure, the reconstructed M-features 940 may be used to encode and decode the visual data in an input block 905. The reconstructed machine-targeted features 940 may be processed by one or more neural network 951 (or other processing algorithm) in order to convert them to a representation which may be more similar to a video frame's block, such as that of video frame block 905. In practice, this may correspond to a "feature to visual-data" conversion. The output of this conversion process (i.e., the processed or converted M-features) may then be used as one of the inputs to compute the prediction residual 952. For example, the residual may be obtained by subtracting from the frame's block 905 the processed M-features from 951 and the output of the prediction module 978. If the processed M-features from 951 are used for computing the residual 952, then the processed M-features from 951 may also be input to the compensation module 976, which may combine the output of the prediction module 978 with the reconstructed residual from 952. For example, the compensation module 976 may consist of adding the output of the prediction module 978, the reconstructed residual from 952 and the processed M-features from 951.

In an example embodiment, the processed M-features for the current block from 951 may be used as one of the inputs to the prediction module 978 for predicting the current block. Thus the prediction from 978 may be based on one or more of the following inputs:
  Other previously reconstructed blocks in the same frame (intra-frame prediction).
  Other previously reconstructed blocks in other frames (inter-frame prediction).
  Processed M-features (from 951) extracted from the same block which is being predicted by the prediction module 978 (simple inter-domain prediction).
  Processed M-features extracted from other blocks in the same frame (intra-frame inter-domain prediction).
  Processed M-features extracted from other blocks in other frames (inter-frame inter-domain prediction).

The output of the residual computation 952 may undergo a human-targeted transformation neural network (H-TNN) 954. The transformed output may undergo quantization 956. The quantized data may be encoded with a lossless codec module, such as a human-targeted entropy encoder 958. The output of the lossless codec module 958 may comprise H-code 960. The H-code may be stored in memory, transmitted to another device, or otherwise made available for decoding.

A lossless decoding module may be used to decode the H-code 960, such as H-entropy decoder 970. The output of the lossless decoding module 970 may undergo inverse quantization, 972. The de-quantized data may undergo inverse transformation (H-ITNN) 974. The de-quantized data from the H-ITNN 974 may be used as input to a compensation module 976. The compensation module or step may also or alternatively take as input the output of the residual computation 952, the output of the prediction module 978, and/or the output of video conversion of the M-features 951. After compensation, the reconstructed video frame's block may result, 980. The prediction module or step 978 may take as input the output of video conversion of the M-features 951 and/or the reconstructed video frame's block 980.

The reconstructed video frame's block 980 may be stored in memory, transmitted to another device, or otherwise made available for display or rendering to one or more humans.

In an example embodiment, the M-features may represent only spatial features. In an alternative example embodiment, the M-features may represent both spatial and temporal information. In this latter case, for each module that requires the M-features in the human-targeted structure (the computation of residual 952, the prediction module 978, the compensation module 976, and/or other modules), the spatio-temporal information of the M-features may be input in one of the following ways:
  In the original form of the features, where the spatial and the temporal information are already combined.
  In a separated form, i.e., either only the spatial or only the temporal information. In this case, the spatio-temporal M-features may be processed in order to separate the spatial and temporal information. For example, the separation process may consist of a sequence of initial NN layers followed by two "branches" of NN layers, where one branch processes the spatial information and the other branch processes the temporal information.

In an example embodiment, the spatial information may be used as an input for one or more of the following tasks: computing the prediction error (residual) 952; and/or intra-frame prediction at 978. In an example embodiment, the temporal information may be used as an input for inter-frame prediction. In an example embodiment, the computation of residual at 952 and/or the intra-prediction and inter-prediction processes at 978 may all receive as input both the spatial and the temporal M-features from 951.

In an example embodiment, instead of or in addition to the conversion of M-features to visual data at 951, there may be a conversion of M-features 940 to parameters that may be used as input in a prediction module of the H-encoder and the H-decoder, e.g. 978. In an example embodiment, M-features 940 may be converted to a motion (vector) field that may be used as input to an inter prediction module, which may be prediction module 978. For example, M-features 940 may be representative of features useful for object tracking, which may be converted to a motion field.

Similar to approach A, training of approach B may use MSE loss and one of the available optimization routines. The description of training is not repeated here in its entirety. In an example embodiment, the training of approach B may consist of using multiple losses, which may include one or more of:
  Task loss(es), which may be derived by using the task NNs 942, 944, and/or 946 (e.g., cross-entropy for classifier NN, MSE for regression NN, etc.). For the k-th task, the loss may be referred to as $L_{Tk}$.
  MSE loss (and/or other perceptual loss) for the human-watchable video. This loss may be referred to as $L_H$. Other suitable losses may be used in addition to or instead of MSE, such as perceptual losses like MS-SSIM, losses derived from neural networks (such as MSE computed on the features extracted by a pre-trained NN, or adversarial losses), etc.
  Rate loss(es), which may comprise one loss for the machine-targeted bitstream ($L_{Rm}$) and one loss for the human-targeted bitstream ($L_{Rn}$). A rate loss may be an objective function which may be (roughly, or most of the time) proportional to entropy. In general, the rate loss may be used to train the codec to encode data into a short bitstream. In some embodiments, the rate loss may be an estimate of the negative probability for the next symbol to be encoded. Minimizing the rate loss during training may thus correspond to minimizing the entropy, and thus to achieving higher compression when using an entropy coding scheme such as arithmetic coding.

If all the foregoing losses are used for training, the total loss may be a weighted sum of the different loss terms:

$$L = \lambda_{Rm}L_{Rm} + \lambda_{Rh}L_{Rh} + \lambda_H L_H + \lambda_{T1}L_{T1} + \lambda_{T2}L_{T2} + \ldots + \lambda_{Tk}L_{Tk}$$

The terms $\lambda_{Rm}$, $\lambda_{Rh}$, $\lambda_h$, $\lambda_{T1}$, $\lambda_{T2}$, and $\lambda_{Tk}$ may represent weights applied to these terms. The weights may change during training.

It should be noted that this is not an exhaustive list of losses that may be included in the training of approach B. Additional or different losses may occur to a person of ordinary skill in the art. It should also be noted that not all the losses discussed above need be used in training.

In an example embodiment, the losses may be used as follows:

The task loss(es) may be used to train the NNs 942, 944, and/or 946 in the machine-targeted structure. This may mean that the task losses may be differentiated with respect to the gradients of the NNs in the machine-targeted structure.

The MSE (and/or other perceptual loss) may be used to train one or more of the NNs in the human-targeted structure (e.g. 951, 954, 958, 974, and/or 978). Alternatively or additionally, the MSE may be used to train some of the NNs in the machine-targeted structure (e.g. 910, 916, 920, 930, 934, and/or 938).

The rate loss computed on the machine-targeted data may be used to train one or more of the NNs in the machine-targeted structure which have an effect on that rate loss, such as any NNs used for lossless encoding (e.g. 920), for feature extraction (e.g. 910), for transformation of the residual (e.g. 916), and/or for prediction of the block-features (e.g. 938).

The rate loss computed on the human-targeted data may be used to train one or more of the NNs in the human-targeted structure which have an effect on that rate loss, such as any NNs used for lossless encoding (e.g. 958), for transformation of the residual (e.g. 954), for prediction of the video frame's block (e.g. 978), and/or for converting the machine-targeted features to visual data (e.g. 951). Alternatively or additionally, the rate loss computed on the human-targeted data may be used to train some of the NNs in the machine-targeted structure (e.g. 910, 916, 920, 930, 934, and/or 938).

When a certain loss term is used to train NNs in both the machine-targeted structure and the human-targeted structure, the loss term may be weighted differently for each of these two cases. Alternatively, the obtained gradients may be weighted differently. For example, MSE may be more important for training the human-targeted structure, and thus the gradients obtained when differentiating the MSE with respect to the parameters of the NNs in the human-targeted structure may be weighted more prominently or heavily than the gradients obtained when differentiating the MSE with respect to the parameters of the NNs in the machine-targeted structure.

In an example embodiment, the task NNs 942, 944, and/or 946 may be modified according to the (respective) task losses. Such modification may comprise modification(s) of the weight(s) of a fixed architecture for the task NN(s) (for example by a training or fine-tuning process), or may comprise architectural modifications where the goal is to simplify or adapt the task NN(s) to the machine-targeted features (M-features).

Figure 10:
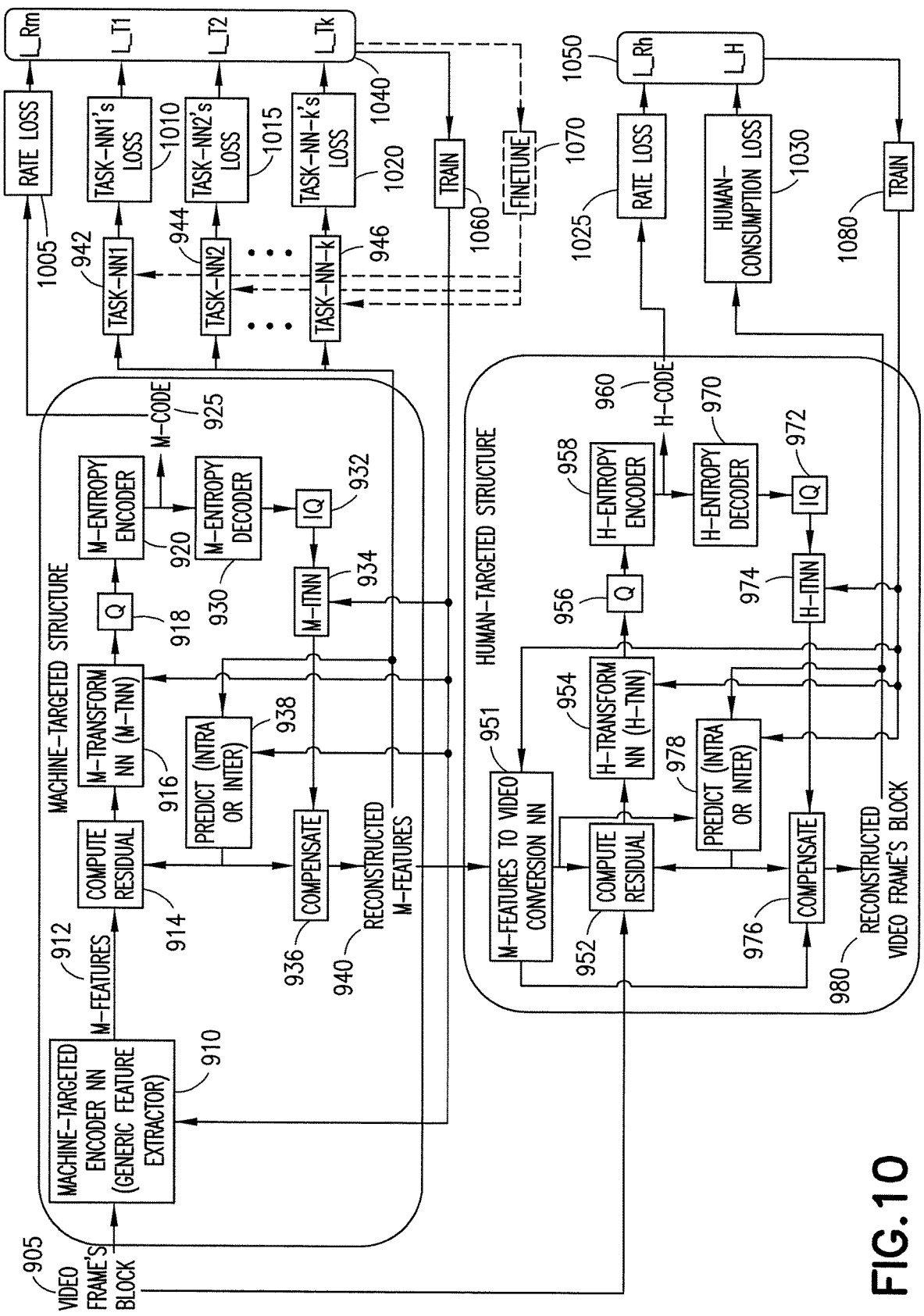
FIG. 10 is a diagram illustrating features as described herein.

Referring now to FIG. 10, illustrated is an example of training an inference pipeline for approach B, similar to that illustrated in FIG. 9 for approach A. Where appropriate, the same numbering as in FIG. 9 has been used, and the description of those components/steps is omitted for the sake of simplicity. A rate loss 1005 may be determined based on the M-code 925. A task loss 1010 may be determined for Task-NN1 942. A task loss 1015 may be determined for Task-NN2 944. A task loss 1020 may be determined for Task-NN-k 946. A rate loss 1025 may be determined based on H-code 960. A human-consumption loss 1030 may be determined based on the reconstructed video frame's block 980 and/or output of the prediction module or step 978. The rate loss 1005, Task-NN1's loss 1010, Task-NN2's loss 1015, and Task-NN-k's loss 1020, collectively referred to at/as 1040, may be used to train 1060 the inverse transformation module or step 934, the transformation module or step 916, the prediction module or step 938, and/or the machine-targeted encoder neural network 910. Additionally or alternatively, the losses 1040 may be used to finetune one or more neural networks configured to perform tasks, including one or more of Task-NN1 942, Task-NN2 944, and/or Task-NN-k 946. Rate loss 1025 and Human-consumption loss 1030, collectively referred to at/as 1050, may be used to train 1080 the inverse transformation module or step 974, the m-features to video conversion neural network 951, the H-transform NN 954, and/or the prediction module or step 978.

FIGS. 9 and 10 illustrates an encoder comprising a decoder loop, which may be used to enable the compensation step of the machine-targeted structure and/or the encoding process used to produce the human-targeted set of encoded data. While a separate decoder is not illustrated in FIGS. 9 and 10, a person of ordinary skill in the art would understand that a decoder, which may or may not be physically or logically separate from the encoder, may process the encoded M-Code 925 and/or the encoded H-Code 960 in a manner similar to the illustrated decoding loops of the machine-targeted structure and/or the human-targeted structure.

In an example embodiment, previously discussed structures may be combined. For example, a first structure (in which a neural encoder and neural decoder may be used as the main encoding and decoding modules, i.e. approach A) may be used to encode and decode information targeted to machines, while a second structure (which performs prediction and transform, where the internal modules are mainly neural networks, i.e. approach B) may be used to encode and decode information targeted to humans. As an alternative, the first structure, approach A, may be used to encode and decode information targeted to humans, while the second structure, approach B, may be used to encode and decode information targeted to machines. These combinations of structures may allow for a cascade design, where image or video data is first encoded and decoded for machine consumption, and additional information is encoded and decoded for human consumption. Thus, reconstructing a video for human consumption may require first decoding video for machine consumption and then combining this decoded video with the decoded additional information.

Figure 11:
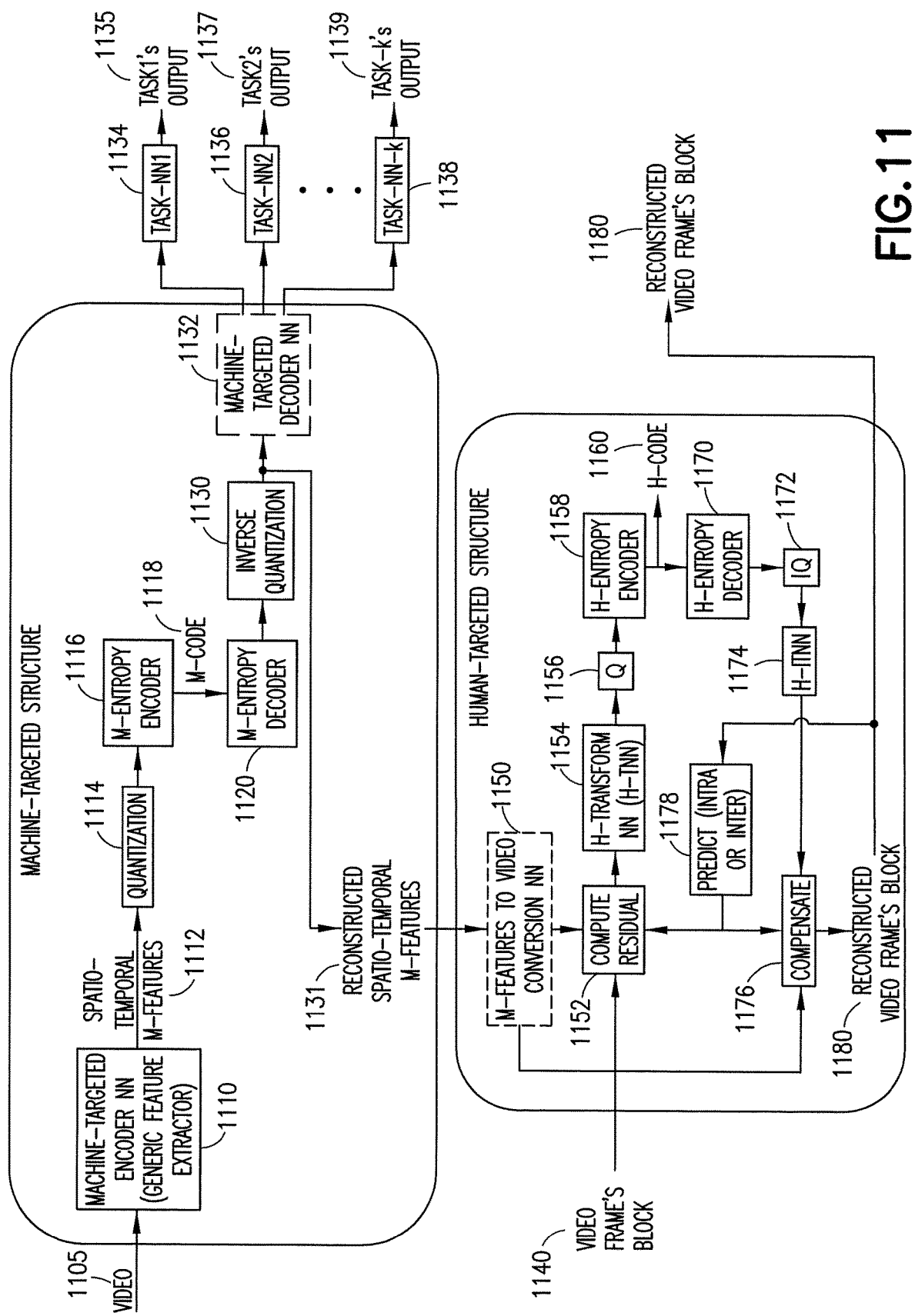
FIG. 11 is a diagram illustrating features as described herein.

Referring now to FIG. 11, illustrated is an example embodiment in which approaches A and B may be combined. In FIG. 11, an encoder-decoder structure from approach A may be used for the machine-targeted structure, and a prediction-transform structure from approach B may be used for the human-targeted structure. It should be understood that other combinations of approaches A and B may be possible, and that the example embodiment may additionally incorporate features not here shown. The machine-targeted structure may receive or retrieve as input a whole video or a video segment (a subset of video frames) 1105. The human-targeted structure may receive or retrieve as input a block from a video frame or a video frame 1140. The M-features extracted from a video or video segment 1105 may thus represent spatio-temporal information 1112 for a superset of block and/or frames with respect to the data which is considered by the human-targeted structure, i.e. 1140. In other words, a video or video segment 1105 input to the machine-targeted structure may comprise/include a video frame block 1140 input to the human-targeted structure. Thus, the processed M-features 1131 extracted from a set of frames 1105 may be used by the human-targeted structure for multiple iterations, i.e., for encoding and decoding multiple blocks and frames 1140.

Referring now to FIG. 11, where the machine-targeted structure is similar to FIG. 6, a video or a video segment 1105 may be input to a machine-targeted neural encoder 1110, which may be configured to perform generic feature extraction. The output spatio-temporal M-features 1112 may undergo quantization 1114. The quantized output may undergo lossless encoding 1116, which may be performed with a machine-targeted entropy encoder or some other module(s) known to one of ordinary skill in the art. The M-code 1118 may be decoded using a lossless encoder, such as M-entropy decoder 1120 or some other module(s) known to one of ordinary skill in the art. The decoded output may undergo inverse quantization, 1130. The inverse quantized output may be decoded with a machine-targeted decoder neural network 1132, which may for example comprise reverse operations with respect to the operations performed by the neural encoder 1110. Note that decoding with the machine-targeted decoder NN 1132 comprises an optional step/component.

The reconstructed video, video segment, or M-features may be input to the task neural networks at 1134, 1136, and/or 1138. Task-NN1 (1134), Task-NN2 (1136), and additional task neural networks up to and including Task-NN-k (1138) may each produce output, i.e. 1135, 1137, and 1139, respectively. Output may comprise processed video or video segments, or the results of analysis, e.g. M-features.

Referring now to FIG. 11, where the human-targeted structure is similar to FIG. 9, the reconstructed spatio-temporal M-features 1131 may be used to encode and decode the visual data in a video frame block 1140. The reconstructed machine-targeted features 1131 may be processed by one or more neural networks 1150 (or other processing algorithm) in order to convert them to a representation which may be more similar to a video frame's block, such as that of video frame block 1140. Note that this conversion is an optional step. The output of this conversion process (i.e., the processed or converted M-features) 1150, if performed, may then be used as one of the inputs to compute the prediction residual 1152. Else, the reconstructed spatio-temporal M-features 1131 may be used as one of the inputs to compute the prediction residual 1152. In an example, the residual may be obtained by subtracting from the frame's block 1140 the processed M-features from 1150 and the output of a prediction module 1178. If the processed M-features from 1150 are used for computing the residual 1152, then the processed M-features from 1150 may also be input to the compensation module 1176, which may combine the output of the prediction module 1178 with the reconstructed residual from 1152 and de-quantized decoded data from 1174. For example, the compensation module 1176 may consist of adding the output of the prediction module 1178, the reconstructed residual from 1152 and the processed M-features from 1150. Alternatively, the reconstructed spatio-temporal M-features 1131 may be used as input to the compensation module 1176.

The output of the residual computation 1152 may undergo a human-targeted transformation neural network (H-TNN) 1154. The transformed output may undergo quantization 1156. The quantized data may be encoded with a lossless codec module, such as a human-targeted entropy encoder 1158. The output of the lossless encoder module 1158 may comprise H-code 1160. The H-code 1160 may be stored in memory, transmitted to another device, or otherwise made available for decoding.

As discussed below, FIG. 11 illustrates a human-targeted structure comprising a decoder loop, which may be used to enable the compensation step of the human-targeted structure to produce the human-targeted set of encoded data. While a separate decoder is not illustrated in FIG. 11, a person of ordinary skill in the art would understand that a decoder, which may or may not be physically or logically separate from the encoder, may process the encoded H-Code 1160 in a manner similar to the illustrated decoding loop of the human-targeted structure.

A lossless decoding module may be used to decode the H-code 1160, such as H-entropy decoder 1170. The output of the lossless decoding module 1170 may undergo inverse quantization, 1172. The de-quantized data may undergo inverse transformation (H-ITNN) 1174. The de-quantized data from the H-ITNN 1174 may be used as input to a compensation module 1176. After compensation, the reconstructed video frame's block may result, 1180. The prediction module or step 1178 may take as input the reconstructed video frame's block 1180.

The reconstructed video frame's block 1180 may be stored in memory, transmitted to another device, or otherwise made available for display or rendering to one or more humans.

Figure 12:
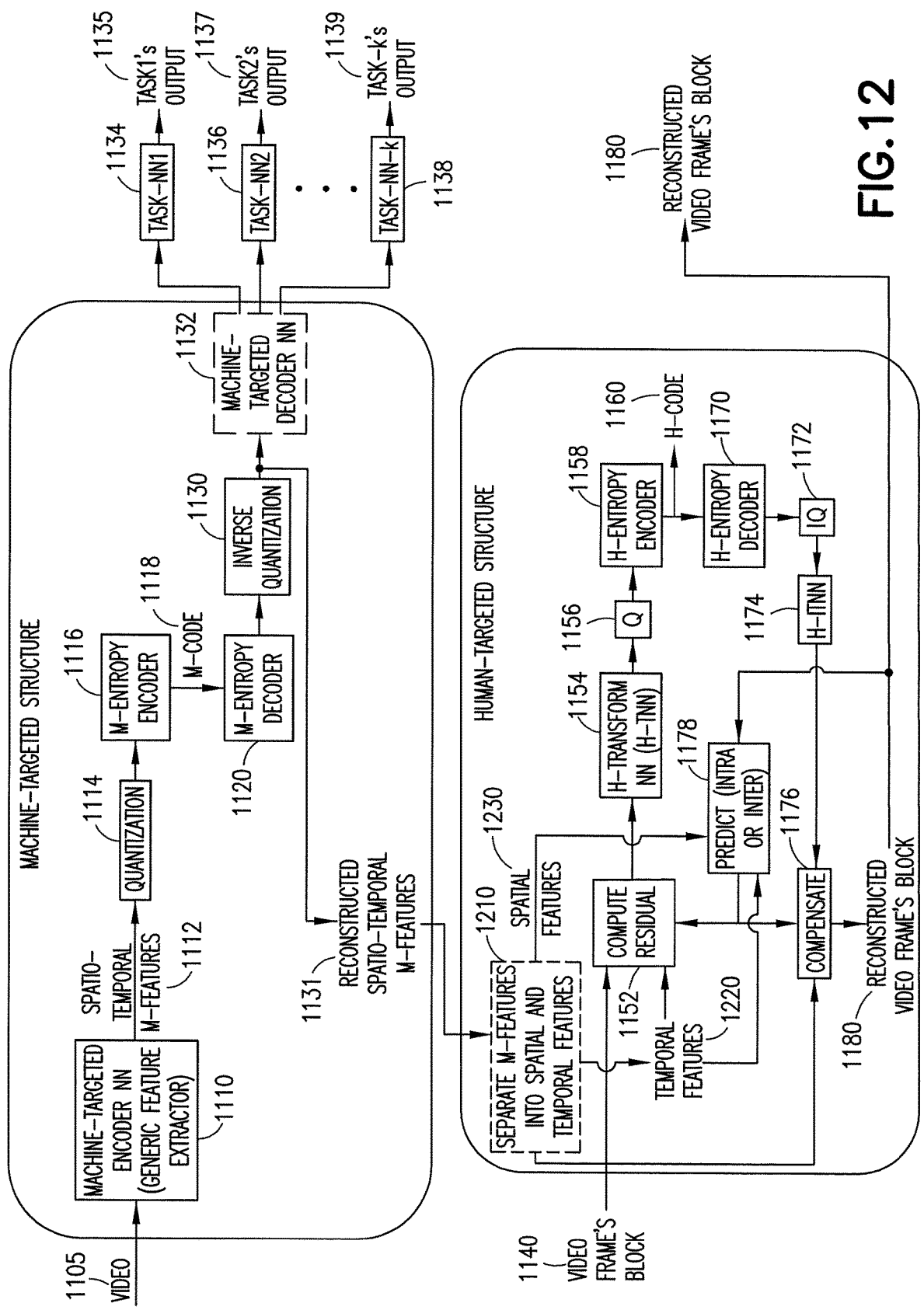
FIG. 12 is a diagram illustrating features as described herein.

Referring now to FIG. 12, illustrated is a combination of approaches A and B similar to that illustrated in FIG. 11. Where appropriate, the same labels have been used, and duplicative description has been omitted. In contrast to FIG. 11, FIG. 12 demonstrates an example embodiment in which separated spatial and temporal information of the processed M-features 1131 may optionally be used within the human-targeted structure.

Reconstructed spatio-temporal M-features 1131 may optional be separated into spatial M-features 1230 and temporal M-features 1220. In contrast to FIG. 11, in which reconstructed spatio-temporal M-features 1131 were optionally M-features to video converted with a neural network at 1150 and the output used as an input to compute the residual at 1152 and used to perform compensation at 1176, in FIG. 12, it is possible that only the temporal features 1220 are used as input to compute the residual at 1152, while both the separated spatial features 1230 and temporal features 1220 are used as input to perform compensation at 1176. Additionally, one or more of the spatial features 1230 and the temporal features 1220 may be used as input to the prediction module 1178.

In an example embodiment, the computation of a residual may include/involve one or more neural networks.

In an example embodiment, some components of the machine-targeted structure or the human-targeted structure may be similar to components of a conventional video codecs. In such an embodiment, a rate loss derived from the rate estimated by the conventional video codec may be used for training the neural network component(s).

In an example embodiment, there may be provided methods for encoding and decoding of video data so that the encoded video data can be initially decoded for human consumption, and then additional encoded video data can be decoded for machine consumption and analysis. For example, there may be a human-targeted structure for encoding video data that may comprise a conventional video encoder, which may be similar to the structure described with reference to FIG. 4 and/or to the structure described with reference to FIG. 8. As in those figures, a video frame or block of a video frame may be encoded such that human-targeted code or bits are produced, i.e. human-targeted encoded video data. The human-targeted encoded video data may be encoded for display to a human agent, using a process similar to that described with reference to FIGS. 4 and/or 8, or known to one of ordinary skill in the art. A person of ordinary skill in the art would know of additional video codecs which may be used to encode a video for human consumption.

A machine-targeted structure for encoding video data may be provided which may comprise one or more neural networks, which may be similar to the machine-targeted structure described with reference to e.g. FIG. 9, in that the machine-targeted structure may be configured to include a step of extracting machine-targeted features. The extracted machine-targeted features may be encoded with reference to the human-targeted encoded video data, such that a combination of the human-targeted encoded video data and the encoded machine-targeted features may be decoded to provide a version of the decoded video suitable for input to a computer agent.

Figure 13:
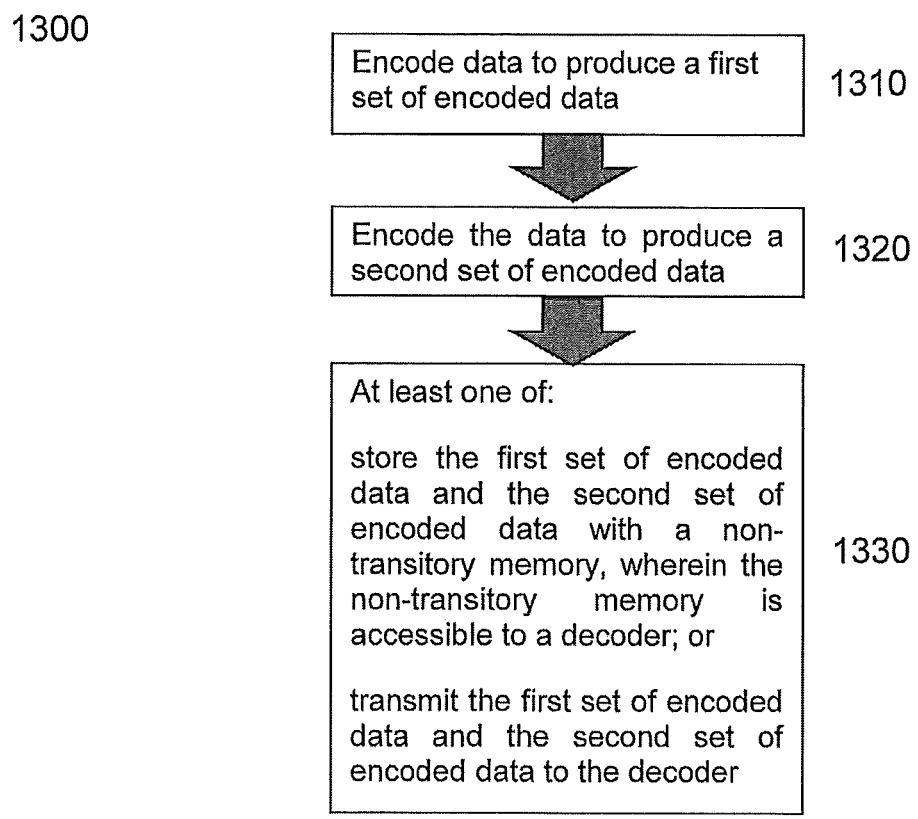
FIG. 13 is a flowchart illustrating steps as described herein.

FIG. 13 illustrates the potential steps of an example embodiment. In accordance with one aspect, an example method 1300 may be provided comprising: encoding data to produce a first set of encoded data, 1310; encoding the data to produce a second set of encoded data, 1320; and at least one of: storing the first set of encoded data and the second set of encoded data with a non-transitory memory, wherein the non-transitory memory is accessible to a decoder; or transmitting the first set of encoded data and the second set of encoded data to the decoder, 1330.

Figure 14:
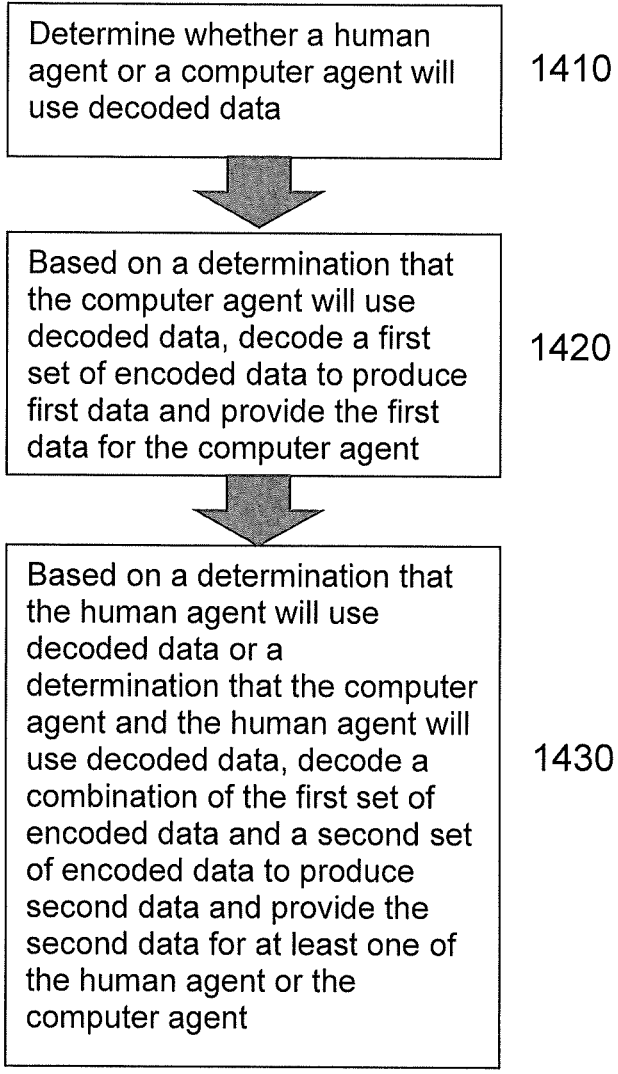
FIG. 14 is a flowchart illustrating steps as described herein.

FIG. 14 illustrates the potential steps of an example embodiment. In accordance with one aspect, an example method 1400 may be provided comprising: determining whether a human agent or a computer agent will use decoded data, 1410; based on a determination that the computer agent will use decoded data, decoding a first set of encoded data to produce first data and providing the first data for the computer agent, 1420; and based on a determination that the human agent will use decoded data or a determination that the computer agent and the human agent will use decoded data, decoding a combination of the first set of encoded data and a second set of encoded data to produce second data and providing the second data for at least one of the human agent or the computer agent, 1430.

Figure 15:
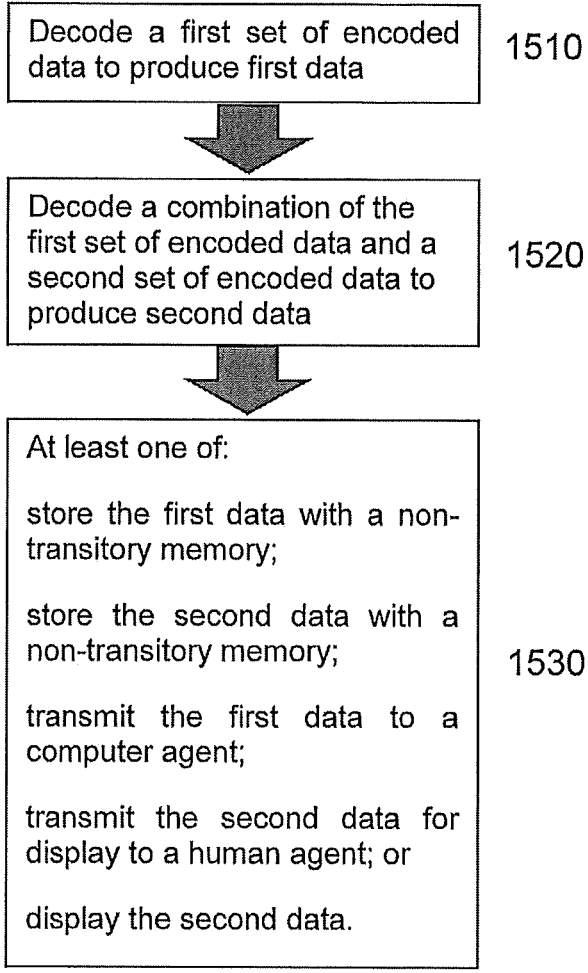
FIG. 15 is a flowchart illustrating steps as described herein.

FIG. 15 illustrates the potential steps of an example embodiment. In accordance with one aspect, an example method 1500 may be provided comprising: decoding a first set of encoded data to produce first data, 1510; decoding a combination of the first set of encoded data and a second set of encoded data to produce second data, 1520; and at least one of: storing the first data with a non-transitory memory; storing the second data with a non-transitory memory; transmitting the first data to a computer agent; transmitting the second data for display to a human agent; or displaying the second data, 1530.

Figure 16:
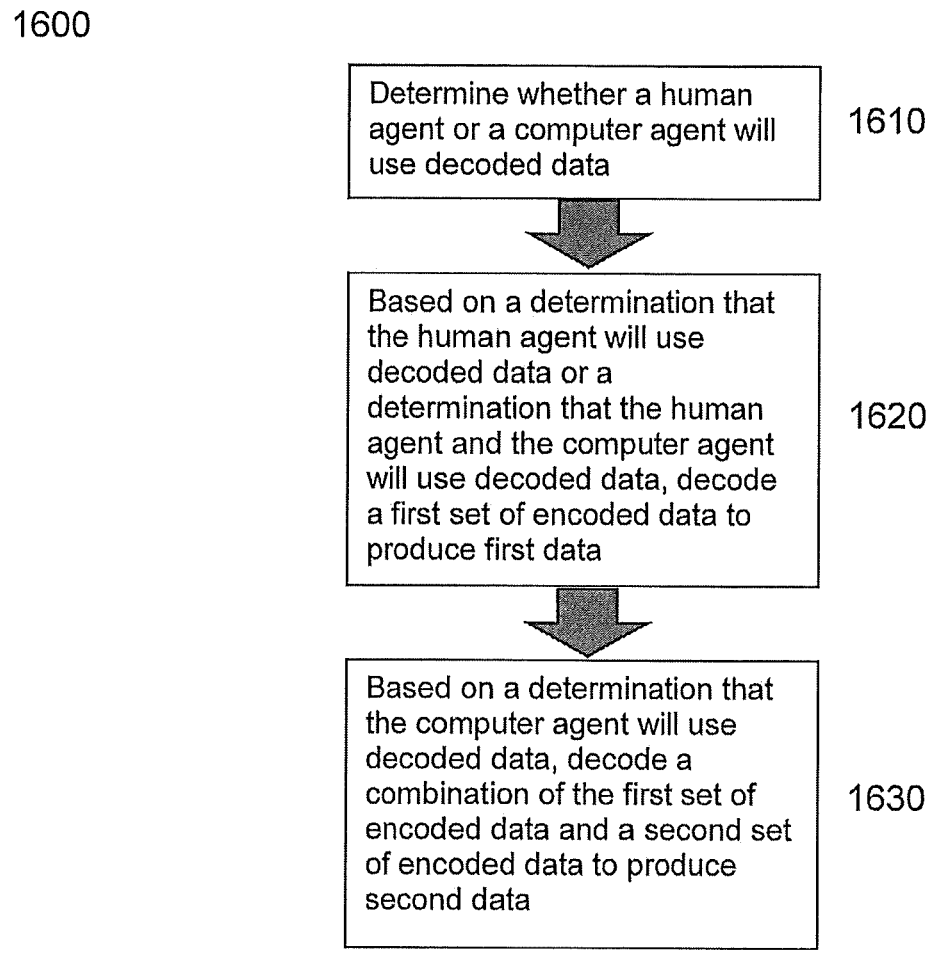
FIG. 16 is a flowchart illustrating steps as described herein.

FIG. 16 illustrates the potential steps of an example embodiment. In accordance with one aspect, an example method 1600 may be provided comprising: determining whether a human agent or a computer agent will use decoded data, 1610; based on a determination that the human agent will use decoded data or a determination that the human agent and the computer agent will use decoded data, decoding a first set of encoded data to produce first data, 1620; and based on a determination that the computer agent will use decoded data, decoding a combination of the first set of encoded data and a second set of encoded data to produce second data, 1630.

In accordance with one aspect, an example method may be provided comprising: encoding data to produce a first set of encoded data; encoding the data to produce a second set of encoded data; and at least one of: storing the first set of encoded data and the second set of encoded data with a non-transitory memory, wherein the non-transitory memory may be accessible to a decoder; or transmitting the first set of encoded data and the second set of encoded data to the decoder.

The encoding of the data to produce the first set of encoded data may comprise neural encoding the data; quantizing the neural encoded data; and lossless encoding the quantized neural encoded data.

The neural encoding of the data may comprise use of machine-targeted neural networks, which may comprise one of: a convolutional neural network; a recurrent neural network; or a two-stream convolutional network.

The encoding of the data to produce the second set of encoded data may comprise: neural encoding the data, wherein neural encoding the data may comprise combination of machine-targeted features extracted from the data with output of initial layers of a human-targeted neural network; quantizing the neural encoded data; and lossless encoding the quantized neural encoded data.

The encoding of the data to produce the second set of encoded data may comprise: computing a residual of a portion of the data, wherein the computing of the residual may be based on a prediction based on a previously decoded portion of the data, a compensation, and machine-targeted features extracted from the data which are converted to with a conversion neural network; transforming the computed residual; quantizing the transformed residual; and lossless encoding the quantized transformed residual.

The encoding of the data to produce the first set of encoded data may comprise: computing a residual of a portion of the data, wherein the computing of the residual may be based on a prediction based on a previously decoded portion of the data and a compensation; transforming the computed residual; quantizing the transformed residual; and lossless encoding the quantized transformed residual.

The first set of encoded data may be configured to be decoded for analysis with a computer agent.

The second set of encoded data may be configured to be decoded with the first set of encoded data for use with a human agent.

The data may be encoded with at least one neural network.

In accordance with one example embodiment, an apparatus may comprise: at least one processor; and at least one memory including computer program code; the at least one memory and the computer program code configured to, with the at least one processor, cause the apparatus to: encode data to produce a first set of encoded data; encode the data to produce a second set of encoded data; and at least one of: store the first set of encoded data and the second set of encoded data; or transmit the first set of encoded data and the second set of encoded data to a decoder.

The encoding of the data to produce the first set of encoded data may further comprise the at least one memory and the computer program are configured to, with the at least one processor, cause the apparatus at least to: neural encode the data; quantize the neural encoded data; and lossless encode the quantized neural encoded data.

The encoding of the data to produce the second set of encoded data may further comprise the at least one memory and the computer program are configured to, with the at least one processor, cause the apparatus at least to: neural encode the data, wherein neural encoding the data comprises combination of machine-targeted features extracted from the data with output of initial layers of a human-targeted neural network; quantize the neural encoded data; and lossless encode the quantized neural encoded data.

The encoding of the data to produce the second set of encoded data may further comprise the at least one memory and the computer program are configured to, with the at least one processor, cause the apparatus at least to: compute a residual of a portion of the data, wherein the computing of the residual may be based on a prediction based on a previously decoded portion of the data, a compensation, and machine-targeted features extracted from the data which are converted with a conversion neural network; transform the computed residual; quantize the transformed residual; and lossless encode the quantized transformed residual.

The encoding of the data to produce the first set of encoded data may further comprise the at least one memory and the computer program are configured to, with the at least one processor, cause the apparatus at least to: compute a residual of a portion of the data, wherein the computing of the residual may be based on a prediction based on a previously decoded portion of the data and a compensation; transform the computed residual; quantize the transformed residual; and lossless encode the quantized transformed residual.

In accordance with one example embodiment, an apparatus may comprise: circuitry configured to perform: encode data to produce a first set of encoded data; encode the data to produce a second set of encoded data; and at least one of: store the first set of encoded data and the second set of encoded data; or transmit the first set of encoded data and the second set of encoded data to a decoder.

The encoding of the data to produce the first set of encoded data may further comprise the at least one memory and the computer program are configured to, with the at least one processor, cause the apparatus at least to: neural encode the data; quantize the neural encoded data; and lossless encode the quantized neural encoded data.

The encoding of the data to produce the second set of encoded data may further comprise the at least one memory and the computer program are configured to, with the at least one processor, cause the apparatus at least to: neural encode the data, wherein neural encoding the data comprises combination of machine-targeted features extracted from the data with output of initial layers of a human-targeted neural network; quantize the neural encoded data; and lossless encode the quantized neural encoded data.

The encoding of the data to produce the second set of encoded data may further comprise the at least one memory and the computer program are configured to, with the at least one processor, cause the apparatus at least to: compute a residual of a portion of the data, wherein the computing of the residual may be based on a prediction based on a previously decoded portion of the data, a compensation, and machine-targeted features extracted from the data which are converted with a conversion neural network; transform the computed residual; quantize the transformed residual; and lossless encode the quantized transformed residual.

The encoding of the data to produce the first set of encoded data may further comprise the at least one memory and the computer program are configured to, with the at least one processor, cause the apparatus at least to: compute a residual of a portion of the data, wherein the computing of the residual may be based on a prediction based on a previously decoded portion of the data and a compensation; transform the computed residual; quantize the transformed residual; and lossless encode the quantized transformed residual.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: encoding data to produce a first set of encoded data; encoding the data to produce a second set of encoded data; and at least one of: storing the first set of encoded data and the second set of encoded data with a non-transitory memory, wherein the non-transitory memory may be accessible to a decoder; or transmitting the first set of encoded data and the second set of encoded data to the decoder.

The means configured to perform encoding the data to produce the first set of encoded data may comprise means configured to perform: neural encoding the data; quantizing the neural encoded data; and lossless encoding the quantized neural encoded data.

The means configured to perform neural encoding the data may be further configured to perform using machine-targeted neural networks, comprising one of: a convolutional neural network; a recurrent neural network; or a two-stream convolutional network.

The means configured to perform encoding the data to produce the second set of encoded data may comprise means configured to perform: neural encoding the data, wherein neural encoding the data may comprise combination of machine-targeted features extracted from the data with output of initial layers of a human-targeted neural network; quantizing the neural encoded data; and lossless encoding the quantized neural encoded data.

The means configured to perform encoding the data to produce the second set of encoded data may comprise means configured to perform: computing a residual of a portion of the data, wherein the computing of the residual may be based on a prediction based on a previously decoded portion of the data, a compensation, and machine-targeted features extracted from the data which are converted with a conversion neural network; transforming the computed residual; quantizing the transformed residual; and lossless encoding the quantized transformed residual.

The first set of encoded data may be configured to be decoded for analysis with a computer agent.

The means configured to perform encoding the data to produce the first set of encoded data may comprise means configured to perform: computing a residual of a portion of the data, wherein the computing of the residual may be based on a prediction based on a previously decoded portion of the data and a compensation; transforming the computed residual; quantizing the transformed residual; and lossless encoding the quantized transformed residual.

The second set of encoded data may be configured to be decoded with the first set of encoded data for use with a human agent.

The data may be encoded with at least one neural network.

In accordance with one example embodiment, a non-transitory computer-readable medium comprising program instructions stored thereon which, when executed with at least one processor, cause the at least one processor to perform: encode data to produce a first set of encoded data; encode the data to produce a second set of encoded data; and at least one of: store the first set of encoded data and the second set of encoded data; or transmit the first set of encoded data and the second set of encoded data to a decoder.

The encoding of the data to produce the first set of encoded data may comprise: neural encoding the data; quantizing the neural encoded data; and lossless encoding the quantized neural encoded data.

The encoding of the data to produce the second set of encoded data may comprise: neural encoding the data, wherein neural encoding the data may comprise combination of machine-targeted features extracted from the data with output of initial layers of a human-targeted neural network; quantizing the neural encoded data; and lossless encoding the quantized neural encoded data.

The encoding of the data to produce the second set of encoded data may comprise: computing a residual of a portion of the data, wherein the computing of the residual may be based on a prediction based on a previously decoded portion of the data, a compensation, and machine-targeted features extracted from the data which are converted with a conversion neural network; transforming the computed residual; quantizing the transformed residual; and lossless encoding the quantized transformed residual.

The encoding of the data to produce the first set of encoded data may comprise: computing a residual of a portion of the data, wherein the computing of the residual may be based on a prediction based on a previously decoded portion of the data and a compensation; transforming the computed residual; quantizing the transformed residual; and lossless encoding the quantized transformed residual.

In accordance with one aspect, an example method may be provided comprising: determining whether a human agent or a computer agent will use decoded data; based on a determination that the computer agent will use decoded data, decoding a first set of encoded data to produce first data and providing the first data for the computer agent; and based on a determination that the human agent will use decoded data or a determination that the computer agent and the human agent will use decoded data, decoding a combination of the first set of encoded data and a second set of encoded data to produce second data and providing the second data for at least one of the human agent or the computer agent.

The decoding of the first set of encoded data to produce the first data may comprise: lossless decoding the first set of encoded data; and inverse quantizing the lossless decoded first set of encoded data.

The decoding of the first set of encoded data to produce the first data may comprise neural decoding the inverse quantized lossless decoded first set of encoded data.

The neural decoding may comprise use of a machine-targeted neural network, which may comprise one of: a convolutional neural network; a recurrent neural network; or a two-stream convolutional network.

The decoding of the combination of the first set of encoded data and the second set of encoded data to produce the second data may comprise: lossless decoding the second set of encoded data; inverse quantizing the lossless decoded second set of encoded data; and neural decoding a combination of the inverse quantized lossless decoded second set of encoded data and the inverse quantized lossless decoded first set of encoded data.

The decoding of the combination of the first set of encoded data and the second set of encoded data to produce the second data may comprise: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The decoding of the first set of encoded data to produce the first data may comprise: lossless decoding the first set of encoded data; inverse quantizing the lossless decoded first set of encoded data; inverse transforming the inverse quantized lossless decoded first set of encoded data; and compensating the inverse transformed inverse quantized lossless decoded first set of encoded data.

The decoding of the combination of the first set of encoded data and the second set of encoded data to produce the second data may comprise: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The example method may further comprise storing in a buffer at least one of: the first set of encoded data; the first data; the second set of encoded data; or the second data.

The first data may be configured for analysis with the computer agent.

The example method may further comprise analyzing the first data with at least one neural network.

The determining of whether the human agent or the computer agent will use decoded data may comprise determining that the computer agent will use decoded data, wherein the first data may be analyzed independent of the human agent.

The example method may further comprise, based on the analyzing of the first data, sending a notification to the human agent; and decoding the first set of encoded data with the second set of encoded data to produce the second data and displaying the second data.

The displaying of the second data may further comprise at least one of: displaying a portion of the second data that corresponds to a portion of the first data that triggered the sending of the notification to the human agent; displaying a portion of the second data that corresponds to a portion of the first data following the portion of the first data that triggered the sending of the notification to the human agent; or in response to an indication received from the human agent, displaying a portion of the second data indicated with the received indication.

The second data may be configured to be of a quality appropriate for human perception.

At least one of the first set of encoded data or the second set of encoded data may be decoded with at least one neural network.

The providing of the first data for the computer agent may comprise transmitting the first data to one or more task neural networks.

The example method may further comprise at least one of: determining a first rate loss based, at least partially, on the first set of encoded data; transmitting the first data to one or more task neural networks and determining a respective task loss for the one or more task neural networks; determining a consumption loss based, at least partially, on the second video data; or determining a second rate loss based, at least partially, on the second set of encoded data.

The example method may further comprise at least one of: causing training of at least one neural network used to encode the first set of encoded data based, at least partially, on the first rate loss; causing training of at least one neural network used to decode the first set of encoded data based, at least partially, on the first rate loss; causing training of the one or more task neural networks based, at least partially, on the first rate loss; causing training of the at least one neural network used to encode the first set of encoded data based, at least partially, on the one or more task losses; causing training of the at least one neural network used to decode the first set of encoded data based, at least partially, on the one or more task losses; causing training of the one or more task neural networks based, at least partially, one the one or more task losses; causing training of at least one neural network used to encode the second set of encoded data based, at least partially, on the consumption loss; causing training of at least one neural network used to decode the second set of encoded data based, at least partially, on the consumption loss; causing training of the at least one neural network used to encode the second set of encoded data based, at least partially, on the second rate loss; or causing training of the at least one neural network used to decode the second set of encoded data based, at least partially, on the second rate loss.

In accordance with one example embodiment, an apparatus may comprise: at least one processor; and at least one memory including computer program code; the at least one memory and the computer program code configured to, with the at least one processor, cause the apparatus to: determine whether a human agent or a computer agent will use decoded data; based on a determination that the computer agent will use decoded data, decode a first set of encoded data to produce first data and providing the first data for the computer agent; and based on a determination that the human agent will use decoded data or a determination that the computer agent and the human agent will use decoded data, decode a combination of the first set of encoded data and a second set of encoded data to produce second data and providing the second data for at least one of the human agent or the computer agent.

The decoding of the first set of encoded data to produce the first data may comprise: lossless decoding the first set of encoded data; and inverse quantizing the lossless decoded first set of encoded data.

The decoding of the combination of the first set of encoded data and the second set of encoded data to produce the second data may comprise: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The decoding of the first set of encoded data to produce the first data may comprise: lossless decoding the first set of encoded data; inverse quantizing the lossless decoded first set of encoded data; inverse transforming the inverse quantized lossless decoded first set of encoded data; and compensating the inverse transformed inverse quantized lossless decoded first set of encoded data.

The example apparatus may be further configured to perform at least one of: determine a first rate loss based, at least partially, on the first set of encoded data; transmit the first data to one or more task neural networks and determine a respective task loss for the one or more task neural networks; determine a consumption loss based, at least partially, on the second video data; or determine a second rate loss based, at least partially, on the second set of encoded data.

The example apparatus may be further configured to perform at least one of: cause training of at least one neural network used to encode the first set of encoded data based, at least partially, on the first rate loss; cause training of at least one neural network used to decode the first set of encoded data based, at least partially, on the first rate loss; cause training of the one or more task neural networks based, at least partially, on the first rate loss; cause training of the at least one neural network used to encode the first set of encoded data based, at least partially, on the one or more task losses; cause training of the at least one neural network used to decode the first set of encoded data based, at least partially, on the one or more task losses; cause training of the one or more task neural networks based, at least partially, one the one or more task losses; cause training of at least one neural network used to encode the second set of encoded data based, at least partially, on the consumption loss; cause training of at least one neural network used to decode the second set of encoded data based, at least partially, on the consumption loss; cause training of the at least one neural network used to encode the second set of encoded data based, at least partially, on the second rate loss; or cause training of the at least one neural network used to decode the second set of encoded data based, at least partially, on the second rate loss.

In accordance with one example embodiment, an apparatus may comprise: determine whether a human agent or a computer agent will use decoded data; based on a determination that the computer agent will use decoded data, decode a first set of encoded data to produce first data and providing the first data for the computer agent; and based on a determination that the human agent will use decoded data or a determination that the computer agent and the human agent will use decoded data, decode a combination of the first set of encoded data and a second set of encoded data to produce second data and providing the second data for at least one of the human agent or the computer agent.

The means configured to perform decoding the first set of encoded data to produce the first data may comprise means configured to perform: lossless decoding the first set of encoded data; and inverse quantizing the lossless decoded first set of encoded data.

The means configured to perform decoding the combination of the first set of encoded data and the second set of encoded data to produce the second data may comprise means configured to perform: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The means configured to perform decoding of the first set of encoded data to produce the first data may comprise means configured to perform: lossless decoding the first set of encoded data; inverse quantizing the lossless decoded first set of encoded data; inverse transforming the inverse quantized lossless decoded first set of encoded data; and compensating the inverse transformed inverse quantized lossless decoded first set of encoded data.

The means may be further configured to perform storing in a buffer at least one of: the first set of encoded data; the first data; the second set of encoded data; or the second data.

The means may be further configured to perform analyzing the first data with at least one neural network.

The means configured to perform determining whether the human agent or the computer agent will use decoded data may comprise means configured to perform determining that the computer agent will use decoded data, wherein the first data is analyzed independent of the human agent.

The means may be further configured, based on the analyzing of the first data, to perform: sending a notification to the human agent; and decoding the first set of encoded data with the second set of encoded data to produce the second data and displaying the second data.

The means configured to perform displaying the second data may comprise means configured to perform at least one of: displaying a portion of the second data that corresponds to a portion of the first data that triggered the sending of the notification to the human agent; displaying a portion of the second data that corresponds to a portion of the first data following the portion of the first data that triggered the sending of the notification to the human agent; or in response to an indication received from the human agent, displaying a portion of the second data indicated with the received indication.

The second data may be configured to be of a quality appropriate for human perception.

At least one of the first set of encoded data or the second set of encoded data may be decoded with at least one neural network.

The means configured to perform providing the first data for the computer agent may comprise means configured to perform transmitting the first data to one or more task neural networks.

The example apparatus may be further configured to perform at least one of: determine a first rate loss based, at least partially, on the first set of encoded data; transmit the first data to one or more task neural networks and determine a respective task loss for the one or more task neural networks; determine a consumption loss based, at least partially, on the second video data; or determine a second rate loss based, at least partially, on the second set of encoded data.

The example apparatus may be further configured to perform at least one of: cause training of at least one neural network used to encode the first set of encoded data-based, at least partially, on the first rate loss; cause training of at least one neural network used to decode the first set of encoded data based, at least partially, on the first rate loss; cause training of the one or more task neural networks based, at least partially, on the first rate loss; cause training of the at least one neural network used to encode the first set of encoded data based, at least partially, on the one or more task losses; cause training of the at least one neural network used to decode the first set of encoded data based, at least partially, on the one or more task losses; cause training of the one or more task neural networks based, at least partially, one the one or more task losses; cause training of at least one neural network used to encode the second set of encoded data based, at least partially, on the consumption loss; cause training of at least one neural network used to decode the second set of encoded data based, at least partially, on the consumption loss; cause training of the at least one neural network used to encode the second set of encoded data based, at least partially, on the second rate loss; or cause training of the at least one neural network used to decode the second set of encoded data based, at least partially, on the second rate loss.

In accordance with one example embodiment, an apparatus may comprise means for performing: determining whether a human agent or a computer agent will use decoded data; based on a determination that the computer agent will use decoded data, decoding a first set of encoded data to produce first data and providing the first data for the computer agent; and based on a determination that the human agent will use decoded data or a determination that the computer agent and the human agent will use decoded data, decoding a combination of the first set of encoded data and a second set of encoded data to produce second data and providing the second data for at least one of the human agent or the computer agent.

The decoding of the first set of encoded data to produce the first data may comprise: lossless decoding the first set of encoded data; and inverse quantizing the lossless decoded first set of encoded data.

The decoding of the combination of the first set of encoded data and the second set of encoded data to produce the second data may comprise: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The decoding of the first set of encoded data to produce the first data may comprise: lossless decoding the first set of encoded data; inverse quantizing the lossless decoded first set of encoded data; inverse transforming the inverse quantized lossless decoded first set of encoded data; and compensating the inverse transformed inverse quantized lossless decoded first set of encoded data.

The example apparatus may further comprise means for at least one of: determining a first rate loss based, at least partially, on the first set of encoded data; transmitting the first data to one or more task neural networks and determining a respective task loss for the one or more task neural networks; determining a consumption loss based, at least partially, on the second video data; or determining a second rate loss based, at least partially, on the second set of encoded data.

The example apparatus may further comprise means for at least one of: causing training of at least one neural network used to encode the first set of encoded data based, at least partially, on the first rate loss; causing training of at least one neural network used to decode the first set of encoded data based, at least partially, on the first rate loss; causing training of the one or more task neural networks based, at least partially, on the first rate loss; causing training of the at least one neural network used to encode the first set of encoded data based, at least partially, on the one or more task losses; causing training of the at least one neural network used to decode the first set of encoded data based, at least partially, on the one or more task losses; causing training of the one or more task neural networks based, at least partially, one the one or more task losses; causing training of at least one neural network used to encode the second set of encoded data based, at least partially, on the consumption loss; causing training of at least one neural network used to decode the second set of encoded data based, at least partially, on the consumption loss; causing training of the at least one neural network used to encode the second set of encoded data based, at least partially, on the second rate loss; or causing training of the at least one neural network used to decode the second set of encoded data based, at least partially, on the second rate loss.

In accordance with one example embodiment, a non-transitory computer-readable medium comprising program instructions stored thereon which, when executed with at least one processor, cause the at least one processor to perform: determine whether a human agent or a computer agent will use decoded data; based on a determination that the computer agent will use decoded data, decode a first set of encoded data to produce first data and provide the first data for the computer agent; and based on a determination that the human agent will use decoded data or a determination that the computer agent and the human agent will use decoded data, decode a combination of the first set of encoded data and a second set of encoded data to produce second data and provide the second data for at least one of the human agent or the computer agent.

The decoding of the first set of encoded data to produce the first data may comprise: lossless decoding the first set of encoded data; and inverse quantizing the lossless decoded first set of encoded data.

The decoding of the combination of the first set of encoded data and the second set of encoded data to produce the second data may comprise: lossless decoding the second set of encoded data; inverse quantizing the lossless decoded second set of encoded data; inverse transforming the inverse quantized lossless decoded second set of encoded data; and compensating a combination of the inverse transformed inverse quantized lossless decoded second set of encoded data and machine-targeted features which are converted with a conversion neural network.

The decoding of the first set of encoded data to produce the first data may comprise: lossless decoding the first set of encoded data; inverse quantizing the lossless decoded first set of encoded data; inverse transforming the inverse quantized lossless decoded first set of encoded data; and compensating the inverse transformed inverse quantized lossless decoded first set of encoded data.

The example non-transitory computer-readable medium may further comprise program instructions stored thereon which, when executed with at least one processor, cause the at least one processor to perform at least one of: determine a first rate loss based, at least partially, on the first set of encoded data; transmit the first data to one or more task neural networks and determining a respective task loss for the one or more task neural networks; determine a consumption loss based, at least partially, on the second video data; or determine a second rate loss based, at least partially, on the second set of encoded data.

The example non-transitory computer-readable medium may further comprise program instructions stored thereon which, when executed with at least one processor, cause the at least one processor to perform at least one of: cause training of at least one neural network used to encode the first set of encoded data based, at least partially, on the first rate loss; cause training of at least one neural network used to decode the first set of encoded data based, at least partially, on the first rate loss; cause training of the one or more task neural networks based, at least partially, on the first rate loss; cause training of the at least one neural network used to encode the first set of encoded data based, at least partially, on the one or more task losses; cause training of the at least one neural network used to decode the first set of encoded data based, at least partially, on the one or more task losses; cause training of the one or more task neural networks based, at least partially, one the one or more task losses; cause training of at least one neural network used to encode the second set of encoded data based, at least partially, on the consumption loss; cause training of at least one neural network used to decode the second set of encoded data based, at least partially, on the consumption loss; cause training of the at least one neural network used to encode the second set of encoded data based, at least partially, on the second rate loss; or cause training of the at least one neural network used to decode the second set of encoded data based, at least partially, on the second rate loss.

In accordance with one aspect, an example method may be provided comprising: decoding a first set of encoded data to produce first data; decoding a combination of the first set of encoded data and a second set of encoded data to produce second data; and at least one of: storing the first data with a non-transitory memory; storing the second data with a non-transitory memory; transmitting the first data to a computer agent; transmitting the second data for display to a human agent; or displaying the second data.

In accordance with one example embodiment, an apparatus may comprise: at least one processor; and at least one memory including computer program code; the at least one memory and the computer program code configured to, with the at least one processor, cause the apparatus to: decode a first set of encoded data to produce first data; decode a combination of the first set of encoded data and a second set of encoded data to produce second data; and at least one of: store the first data; store the second data; transmit the first data to a computer agent; transmit the second data for display to a human agent; or display the second data.

In accordance with one example embodiment, an apparatus may comprise: decode a first set of encoded data to produce first data; decode a combination of the first set of encoded data and a second set of encoded data to produce second data; and at least one of: store the first data; store the second data; transmit the first data to a computer agent; transmit the second data for display to a human agent; or display the second data.

In accordance with one example embodiment, an apparatus may comprise means for performing: decoding a first set of encoded data to produce first data; decoding a combination of the first set of encoded data and a second set of encoded data to produce second data; and at least one of: storing the first data; storing the second data; transmitting the first data to a computer agent; transmitting the second data for display to a human agent; or displaying the second data.

In accordance with one example embodiment, a non-transitory computer-readable medium comprising program instructions stored thereon which, when executed with at least one processor, cause the at least one processor to perform: decode a first set of encoded data to produce first data; decode a combination of the first set of encoded data and a second set of encoded data to produce second data; and at least one of: store the first data; store the second data; transmit the first data to a computer agent; transmit the second data for display to a human agent; or display the second data.

In accordance with one aspect, an example method may be provided comprising: determining whether a human agent or a computer agent will use decoded data; based on a determination that the human agent will use decoded data or a determination that the human agent and the computer agent will use decoded data, decoding a first set of encoded data to produce first data; and based on a determination that the computer agent will use decoded data, decoding a combination of the first set of encoded data and a second set of encoded data to produce second data.

In accordance with one example embodiment, an apparatus may comprise: at least one processor; and at least one memory including computer program code; the at least one memory and the computer program code configured to, with the at least one processor, cause the apparatus to: determine whether a human agent or a computer agent will use decoded data; based on a determination that the human agent will use decoded data or a determination that the human agent and the computer agent will use decoded data, decode a first set of encoded data to produce first data; and based on a determination that the computer agent will use decoded data, decode a combination of the first set of encoded data and a second set of encoded data to produce second data.

In accordance with one example embodiment, an apparatus may comprise: determine whether a human agent or a computer agent will use decoded data; based on a determination that the human agent will use decoded data or a determination that the human agent and the computer agent will use decoded data, decode a first set of encoded data to produce first data; and based on a determination that the computer agent will use decoded data, decode a combination of the first set of encoded data and a second set of encoded data to produce second data.

In accordance with one example embodiment, an apparatus may comprise means for performing: determining whether a human agent or a computer agent will use decoded data; based on a determination that the human agent will use decoded data or a determination that the human agent and the computer agent will use decoded data, decoding a first set of encoded data to produce first data; and based on a determination that the computer agent will use decoded data, decoding a combination of the first set of encoded data and a second set of encoded data to produce second data.

In accordance with one example embodiment, a non-transitory computer-readable medium comprising program instructions stored thereon which, when executed with at least one processor, cause the at least one processor to perform: determine whether a human agent or a computer agent will use decoded data; based on a determination that the human agent will use decoded data or a determination that the human agent and the computer agent will use decoded data, decode a first set of encoded data to produce first data; and based on a determination that the computer agent will use decoded data, decode a combination of the first set of encoded data and a second set of encoded data to produce second data.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   determining whether a human agent or a computer agent will use decoded data, wherein the decoded data comprises at least one of: video data, audio data, image data, or neural features;
   obtaining a first set of encoded data, wherein the first set of encoded data comprises data encoded with a machine-targeted encoder neural network;
   obtaining a second set of encoded data, wherein the second set of encoded data comprises data encoded with a human-targeted encoder neural network, wherein the human-targeted encoder neural network is at least partially different from the machine-targeted encoder neural network; and
   based on a determination that the computer agent will use the decoded data, decoding a first set of encoded data to produce first data and providing the first data for the computer agent;
   based on a determination that the human agent will use the decoded data, decoding a combination of the first set of encoded data and the second set of encoded data to produce second data and providing the second data for the human agent; or
   based on a determination that the computer agent and the human agent will use the decoded data, decoding the combination of the first set of encoded data and the second set of encoded data to produce the second data and providing the second data for at least one of the human agent or the computer agent.

2. The method of claim 1, wherein the decoding of the first set of encoded data to produce the first data comprises:
   lossless decoding the first set of encoded data; and
   inverse quantizing the lossless decoded first set of encoded data.

3. The method of claim 1, wherein the decoding of the combination of the first set of encoded data and the second set of encoded data to produce the second data comprises:
   lossless decoding the second set of encoded data;
   inverse quantizing the lossless decoded second set of encoded data;
   inverse transforming the inverse quantized lossless decoded second set of encoded data; and
   compensating a combination of the inverse transformed inverse quantized lossless decoded second set of encoded data and machine-targeted features which are converted with a conversion neural network.

4. The method of claim 1, further comprising at least one of:
   determining a first rate loss based, at least partially, on the first set of encoded data;
   transmitting the first data to one or more task neural networks and determining a respective task loss for the one or more task neural networks;
   determining a consumption loss based, at least partially, on the second set of encoded data; or
   determining a second rate loss based, at least partially, on the second set of encoded data.

5. The method of claim 4, further comprising at least one of:
   causing training of at least one neural network used to encode the first set of encoded data based, at least partially, on the first rate loss;
   causing training of at least one neural network used to decode the first set of encoded data based, at least partially, on the first rate loss;
   causing training of the one or more task neural networks based, at least partially, on the first rate loss;
   causing training of the at least one neural network used to encode the first set of encoded data based, at least partially, on the one or more task losses;
   causing training of the at least one neural network used to decode the first set of encoded data based, at least partially, on the one or more task losses;
   causing training of the one or more task neural networks based, at least partially, one the one or more task losses;
   causing training of at least one neural network used to encode the second set of encoded data based, at least partially, on the consumption loss;
   causing training of at least one neural network used to decode the second set of encoded data based, at least partially, on the consumption loss;
   causing training of the at least one neural network used to encode the second set of encoded data based, at least partially, on the second rate loss; or
   causing training of the at least one neural network used to decode the second set of encoded data based, at least partially, on the second rate loss.

6. An apparatus comprising:
   at least one processor; and
   at least one non-transitory memory and computer program code;
   wherein the at least one memory and the computer program code are configured to, with the at least one processor, cause the apparatus at least to perform:
      determine whether a human agent or a computer agent will use decoded data, wherein the decoded data comprises at least one of: video data, audio data, or image data;
      obtain a first set of encoded data, wherein the first set of encoded data comprises data encoded with a machine-targeted encoder neural network;
      obtain a second set of encoded data, wherein the second set of encoded data comprises data encoded with a human-targeted encoder neural network, wherein the human-targeted encoder neural network is at least partially different from the machine-targeted encoder neural network; and
      based on a determination that the computer agent will use the decoded data, decode a first set of encoded data to produce first data and provide the first data for the computer agent;
      based on a determination that the human agent will use the decoded data, decode a combination of the first set of encoded data and the second set of encoded data to produce second data and provide the second data for the human agent; or
      based on a determination that the computer agent and the human agent will use the decoded data, decode the combination of the first set of encoded data and the second set of encoded data to produce the second data and provide the second data for at least one of the human agent or the computer agent.

7. The apparatus of claim 6, wherein decoding the first set of encoded data to produce the first data comprises the at least one memory and the computer program code are configured to, with the at least one processor, cause the apparatus to:
   lossless decode the first set of encoded data; and
   inverse quantize the lossless decoded first set of encoded data.

8. The apparatus of claim 6, wherein decoding the combination of the first set of encoded data and the second set of encoded data to produce the second data comprises the at least one memory and the computer program code are configured to, with the at least one processor, cause the apparatus to:
   lossless decode the second set of encoded data;
   inverse quantize the lossless decoded second set of encoded data; and
   inverse transform the inverse quantized lossless decoded second set of encoded data; and
   compensate a combination of the inverse transformed inverse quantized lossless decoded second set of encoded data and machine-targeted features which are converted with a conversion neural network.

9. The apparatus of claim 6, wherein the at least one memory and the computer program code are configured to, with the at least one processor, cause the apparatus to perform at least one of:
   determine a first rate loss based, at least partially, on the first set of encoded data;
   transmit the first data to one or more task neural networks and determine a respective task loss for the one or more task neural networks;
   determine a consumption loss based, at least partially, on the second set of encoded data; or
   determine a second rate loss based, at least partially, on the second set of encoded data.

10. The apparatus of claim 9, wherein the at least one memory and the computer program code are configured to, with the at least one processor, cause the apparatus to perform at least one of:
   cause training of at least one neural network used to encode the first set of encoded data based, at least partially, on the first rate loss;
   cause training of at least one neural network used to decode the first set of encoded data based, at least partially, on the first rate loss;
   cause training of the one or more task neural networks based, at least partially, on the first rate loss;
   cause training of the at least one neural network used to encode the first set of encoded data based, at least partially, on the one or more task losses;
   cause training of the at least one neural network used to decode the first set of encoded data based, at least partially, on the one or more task losses;
   cause training of the one or more task neural networks based, at least partially, one the one or more task losses;

cause training of at least one neural network used to encode the second set of encoded data based, at least partially, on the consumption loss;

cause training of at least one neural network used to decode the second set of encoded data based, at least partially, on the consumption loss;

cause training of the at least one neural network used to encode the second set of encoded data based, at least partially, on the second rate loss; or cause training of the at least one neural network used to decode the second set of encoded data based, at least partially, on the second rate loss.

11. The apparatus of claim 6, wherein the data encoded with a machine-targeted encoder neural network comprises at least one of:
   one or more spatial features of original data,
   one or more temporal features of the original data, or
   one or more spatial and temporal features of the original data.

12. The apparatus of claim 7, wherein decoding the first set of encoded data to produce the first data further comprises the at least one memory and the computer program code are configured to, with the at least one processor, cause the apparatus to:
   inverse transform the inverse quantized lossless decoded first set of encoded data with a machine-targeted inverse transform neural network; and
   compensate the inverse transformed inverse quantized lossless decoded first set of encoded data to produce one or more reconstructed machine-targeted features of original data.

13. The apparatus of claim 6, wherein the second set of encoded data comprises one or more reconstructed blocks of original data.

14. The apparatus of claim 6, wherein the data encoded with the machine-targeted encoder neural network comprises a block of pixels.

15. A non-transitory computer-readable medium comprising instructions stored thereon which, when executed with at least one processor, cause the at least one processor to:
   determine whether a human agent or a computer agent will use decoded data, wherein the decoded data comprises at least one of: video data, audio data, image data, or neural features;
   obtain a first set of encoded data, wherein the first set of encoded data comprises data encoded with a machine-targeted encoder neural network;
   obtain a second set of encoded data, wherein the second set of encoded data comprises data encoded with a human-targeted encoder neural network, wherein the human-targeted encoder neural network is at least partially different from the machine-targeted encoder neural network; and
   based on a determination that the computer agent will use the decoded data, decode a first set of encoded data to produce first data and providing the first data for the computer agent;
   based on a determination that the human agent will use the decoded data, decode a combination of the first set of encoded data and the second set of encoded data to produce second data and provide the second data for the human agent; or
   based on a determination that the computer agent and the human agent will use the decoded data, decode the combination of the first set of encoded data and the second set of encoded data to produce the second data and provide the second data for at least one of the human agent or the computer agent.

16. The non-transitory computer-readable medium of claim 15, wherein decoding the first set of encoded data to produce the first data comprises the instructions stored thereon, when executed with the at least one processor, cause the at least one processor to:
   lossless decode the first set of encoded data; and
   inverse quantize the lossless decoded first set of encoded data.

17. The non-transitory computer-readable medium of claim 15, wherein decoding the combination of the first set of encoded data and the second set of encoded data to produce the second data comprises the instructions stored thereon, when executed with the at least one processor, cause the at least one processor to:
   lossless decode the second set of encoded data;
   inverse quantize the lossless decoded second set of encoded data;
   inverse transform the inverse quantized lossless decoded second set of encoded data; and
   compensate a combination of the inverse transformed inverse quantized lossless decoded second set of encoded data and machine-targeted features which are converted with a conversion neural network.

18. The non-transitory computer-readable medium of claim 15, wherein the instructions stored thereon, when executed with the at least one processor, cause the at least one processor to at least one of:
   determine a first rate loss based, at least partially, on the first set of encoded data;
   transmit the first data to one or more task neural networks and determining a respective task loss for the one or more task neural networks;
   determine a consumption loss based, at least partially, on the second set of encoded data; or
   determine a second rate loss based, at least partially, on the second set of encoded data.

19. The non-transitory computer-readable medium of claim 18, wherein the instructions stored thereon, when executed with the at least one processor, cause the at least one processor to at least one of:
   cause training of at least one neural network used to encode the first set of encoded data based, at least partially, on the first rate loss;
   cause training of at least one neural network used to decode the first set of encoded data based, at least partially, on the first rate loss;
   cause training of the one or more task neural networks based, at least partially, on the first rate loss;
   cause training of the at least one neural network used to encode the first set of encoded data based, at least partially, on the one or more task losses;
   cause training of the at least one neural network used to decode the first set of encoded data based, at least partially, on the one or more task losses;
   cause training of the one or more task neural networks based, at least partially, one the one or more task losses;
   cause training of at least one neural network used to encode the second set of encoded data based, at least partially, on the consumption loss;
   cause training of at least one neural network used to decode the second set of encoded data based, at least partially, on the consumption loss;
   cause training of the at least one neural network used to encode the second set of encoded data based, at least partially, on the second rate loss; or cause training of the at least one neural network used to decode the second set of encoded data based, at least partially, on the second rate loss.

* * * * *